(12) United States Patent
Sehgal et al.

(10) Patent No.: US 9,354,989 B1
(45) Date of Patent: May 31, 2016

(54) REGION BASED ADMISSION/EVICTION CONTROL IN HYBRID AGGREGATES

(75) Inventors: Priya Sehgal, Bangalore (IN); Kaladhar Voruganti, Sunnyvale, CA (US); Rajesh Sundaram, Sunnyvale, CA (US)

(73) Assignee: NETAPP, INC, Sunnyvale, CA (US)

( * ) Notice: Subject to any disclaimer, the term of this patent is extended or adjusted under 35 U.S.C. 154(b) by 26 days.

(21) Appl. No.: 13/251,916

(22) Filed: Oct. 3, 2011

(51) Int. Cl.
*G06F 12/08* (2006.01)
*G06F 12/00* (2006.01)
*G06F 11/14* (2006.01)

(52) U.S. Cl.
CPC .................................. *G06F 11/1482* (2013.01)

(58) Field of Classification Search
CPC . G06F 11/0793; G06F 11/34; G06F 11/3409; G06F 11/3419; G06F 12/0813; G06F 12/0866; G06F 12/0888; G06F 17/30132
See application file for complete search history.

(56) References Cited

U.S. PATENT DOCUMENTS

| | | | | |
|---|---|---|---|---|
| 5,394,531 | A * | 2/1995 | Smith | 711/136 |
| 6,470,423 | B1 * | 10/2002 | Ho et al. | 711/129 |
| 7,107,403 | B2 * | 9/2006 | Modha et al. | 711/129 |
| 8,250,306 | B2 * | 8/2012 | Larkby-Lahet et al. | 711/133 |
| 8,312,213 | B2 * | 11/2012 | Sugahara | 711/113 |
| 2005/0097278 | A1 * | 5/2005 | Hsu et al. | 711/129 |
| 2011/0153770 | A1 * | 6/2011 | Antani et al. | 709/208 |
| 2012/0246411 | A1 * | 9/2012 | Birka et al. | 711/133 |
| 2012/0311277 | A1 * | 12/2012 | Chu et al. | 711/158 |
| 2013/0086324 | A1 * | 4/2013 | Soundararajan et al. | 711/122 |

OTHER PUBLICATIONS

Yannis Klonatos; Azor: Using Two-Level Block Selection to Improve SSD-Based I/O Caches—Jul. 28-Jul. 30, 2011—ISBN: 978-0-7695-4509-7.*
U.S. Appl. No. 12/952,001, filed Nov. 23, 2010.
U.S. Appl. No. 13/016,892, filed Jan. 28, 2011.
Jorge Guerra et al., "Cost Effective Storage Using Extent Based Dynamic Tiering." Proceedings of 9th USENIX Conference on File and Storage Technologies (FAST '11), Feb. 2011, 14 pgs.
Jiri Schindler et al., "Improving Throughput for Small Disk Requests With Proximal I/O." Proceedings of 9th USENIX Conference on File and Storage Technologies (FAST '11), Feb. 2011,15 pgs.
EMC Corporation, "EMC CLARiion, Celerra Unified, and VNX Fast Cache, A Detailed Review" EMC Corporation, Jul. 2011, 23 pgs.
Pawan Goyal et al., "CacheCow: QoS for Storage System Cache." Eleventh International Workshop on Quality of Service (IWQoS 03) 2003, 18 pgs.
Oracle, Sun ZFS Storage 7420 Appliance, http://www.oracle.com/us/products/servers-storage/storage/unified-storage/ocom-sun-zfs-storage-7420-appliance-171635.html, accessed Sep. 29, 2011, 2 pgs.
EMC Corporation, "EMC Outlines Strategy to Accelerate Flash Adoption" http://www.emc.com/about/news/press/2011/20110509-05.htm, May 2011, 2 pgs.

* cited by examiner

*Primary Examiner* — Tuan Thai
*Assistant Examiner* — Mohamed Gebril
(74) *Attorney, Agent, or Firm* — Matthew A. Pequignot; Pequignot+Myers LLC

(57) ABSTRACT

Region based admission and eviction control can be used for managing resources (e.g., caching resources) shared by competing workloads with different SLOs in hybrid aggregates. A "region" or "phase" refers to different incoming loads of a workload (e.g., different working set sizes, different intensities of the workload, etc.). These regions can be identified and then utilized along with other factors (e.g., incoming loads of other workloads, maximum cache allocation size, service level objectives, and others factors/parameters) in managing cache storage resources.

29 Claims, 10 Drawing Sheets

REGION BASED ADMISSION/EVICTION CONTROL IN HYBRID AGGREGATES

TECHNICAL FIELD

Various embodiments of the techniques introduced here generally relate to satisfying service level objectives (SLOs) within a network storage system by allocating an appropriate amount of cache partitions to each workload and admitting relevant data or metadata based on the workload's characteristic and/or region. More specifically, some embodiments relate to systems and methods for region based admission and eviction control in hybrid aggregates, where the SSD caching tier is used for read caching.

BACKGROUND

A storage server is a computer that provides network storage services relating to the organization of data on writable, storage media, such as non-volatile memories and disks. A storage server is configured to operate according to a client/server model of information delivery to enable one or more (potentially many) clients to access the data served by the system. A storage server can employ a storage architecture that serves the data with both random and streaming access patterns at either a file level, as in network attached storage (NAS) environments, or at the block level, as in a storage area network (SAN). Storage servers store data on various types of non-volatile storage media such as, for example, relatively high latency (i.e., longer access times) hard disk drive devices (HDDs) and relatively low latency (i.e., shorter access times) such as solid-state devices (SSDs) and flash memory. Some storage servers use a mix of hybrid storage media (e.g., by intermixing relatively expensive but fast electronic storage, such as SSDs with relatively inexpensive magnetic storage, such as HDDs) to provide a total storage space of the system.

A network storage system may have any of various configurations. For example, a network storage system can include a monolithic, non-distributed storage server or it can include one or more distributed storage servers, which may be connected in clusters to allow many storage clients to access data containers that are stored in the storage system and managed by one or more storage servers. Clustered storage servers provide improved scalability and can be configured to communicate with one another to act collectively to increase performance or to offset any single storage system failure within the cluster.

Storage clients can execute any of various applications requiring the data services of a network storage system. Each such application may be considered a "workload" that is serviced by the network storage system. In many cases, a network storage system will simultaneously service numerous workloads of different types and with varying levels of SLOs. In addition, current data center environments support multiple workloads that share the same servers and storage system (i.e., multi-tenant support). The workloads often have one or more specified SLOs relating to a storage system characteristic or attribute. For example, a workload may have an SLO specifying a minimum value of X (the target value) for data throughput (the SLO metric) to be achieved by the network storage system when servicing the workload. Different workloads can interfere with each other by competing for resources to satisfy individual SLOs.

The SLOs can be specified, for example, in terms of performance (e.g., latency, throughput), security, reliability, capacity, protection, etc. Moreover, the characteristics and the workload of the applications can change during different times of the day, as seen by the storage servers. For example, certain e-commerce websites experience peak or average loads during morning time as compared to late evenings. Storage vendors generally agree to meet the SLOs of these applications. Traditionally, storage vendors have taken some efforts to ensure that (a) the SLOs are met and (b) to address SLO violations, keeping in mind the dynamic nature of the workloads. Examples of the efforts to meet the SLOs include SLO conformance and planning, changes in storage data layouts, and dynamically instantiating resources for caching, etc.

SUMMARY

A caching tier can be used as a shared resource amongst various competing workloads with varied performance requirements or SLOs. In traditional storage systems, ensuring that one workload does not utilize more caching resources than needed can be difficult. Moreover, each workload controller is typically focused on meeting SLOs for the workload assigned to the workload controller. As such, each workload controller typically seeks to maximize allocated caching resources without considering caching needs to meet the SLOs for the other workloads. The techniques introduced here include systems and methods for managing resources (e.g., caching resources) shared by competing workloads with different SLOs by using region based admission and eviction control in hybrid aggregates. A "region" or "phase" refers to different incoming loads of a workload (e.g., different working set sizes, different intensities of the workload, etc.). These regions can be identified and then utilized along with other factors (e.g., incoming loads of other workloads, maximum cache allocation size, service level objectives, and others factors/parameters) in managing cache storage resources.

Various embodiments learn and identify the different regions or phases of each workload, size or control eviction of a non-volatile solid-state storage (NVSSS) cache, such as SSD or flash, based on the regions to meet performance SLOs (e.g., latency), and control the admission rules into NVSSS cache layer depending upon the regions to meet performance SLOs. The components and processes are not limited to only two levels of caching (e.g., buffer cache followed by NVSSS), but can be applied to any arbitrary number, n, of levels of cache, provided the appropriate statistics are available from each of the n levels.

In one embodiment, a method for managing caching resources includes identifying an operational phase of a first workload of a plurality of workloads. Then, a cache partition size associated with the first workload controller is determined. The cache partition size is based on the operational phase of the first workload and the service SLO's of the plurality of workloads. Storage in the cache is allocated in accordance with the cache partition size.

The techniques disclosed herein have various advantages, including: bringing the notion of SLO (e.g., latency) to a lower layer (i.e., a software layer closer to the file system) in the storage stack or in the hybrid store to allow resource allocation decisions to be made within the lower layer that are based on the SLO; leveraging SSD read caching to meet an SLO and improve the overall efficiency of the hybrid store; optimizing the use of SSD read cache in a multi-tenant environment with different tenants having varied SLO requirements; providing a mechanism to dynamically re-size or change the admission policies of a workload into the cache depending upon its region; and/or application to n-levels of storage caches.

Embodiments of the present invention also include other methods, systems with various components, and computer-readable storage media containing sets of instructions to cause one or more processors to perform the methods, variations of the methods, and other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
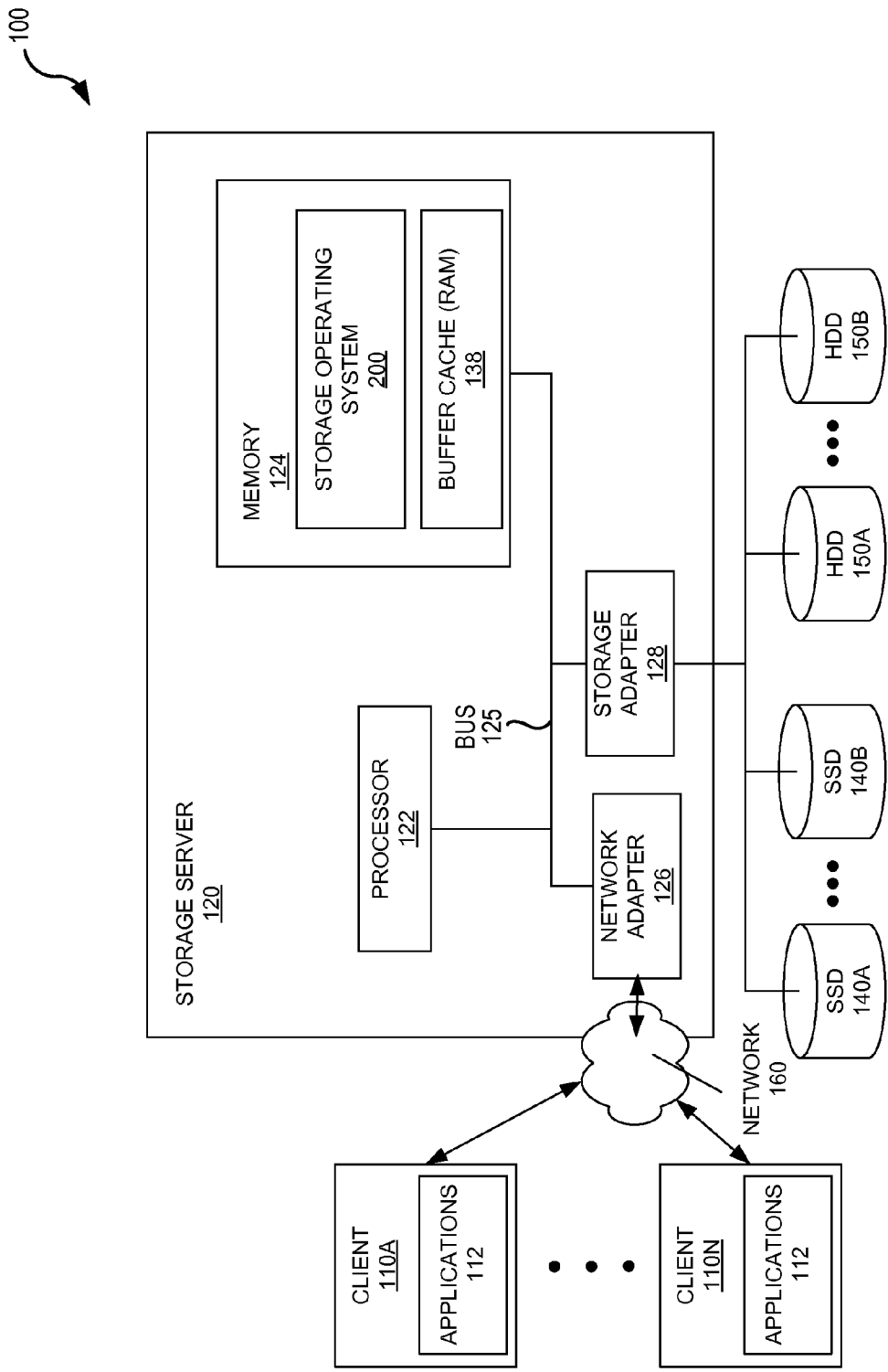
FIG. 1 shows a block diagram of a storage system in which some embodiments of the techniques introduced here may be implemented or utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments disclosed herein generally relate to satisfying service level objectives (SLOs) within a storage system by allocating an appropriate amount (e.g., an optimal or minimal amount) of cache partitions (e.g., a division or a logical part of cache that can be independently managed) associated with various workloads. More specifically, some embodiments relate to systems and methods for region based admission and eviction control in hybrid storage aggregates.

A hybrid storage aggregate, or hybrid store, is a storage system with different tiers or classes of storage. An example of a hybrid store could be a single storage subsystem with SSD (e.g., flash), phase change memory (PCM), and fibre channel or serial ATA. In a hybrid store, the SSD tier is often used as either a read/write cache or data tier (i.e., for permanent storage of data). When the SSD tier is used as a read/write cache, only the HDD tier is used as a persistent data store. In contrast, when the SSD is used as a data tier some data/metadata is exclusively stored either in the SSD or HDD persistently. Various embodiments of the techniques described here apply to a hybrid store where the SSD tier is used just for read caching. As typically used herein, a hybrid store is generally considered to be a lower layer in the IO path of a hybrid storage stack (i.e., at the level of the file system).

An SSD caching tier can be used as a shared resource amongst various competing workloads with varied performance requirements or SLOs. A workload is the load as seen by the storage subsystem as a result of applications running on the clients. In traditional storage systems, ensuring that one workload does not utilize more caching resources than needed can be difficult. Moreover, each workload controller is typically focused on meeting SLOs for the workload assigned to the workload controller. As such, each workload controller is seeking to maximize allocated caching resources without considering caching needs to meet the SLOs for the other workloads. Embodiments of the techniques discussed here provide systems and methods to allow caching resource allocation decisions to be made in the SSD caching tier based on SLOs.

Various embodiments make the SSD caching tier SLO-aware to achieve end-to-end SLOs while managing the multi-tenancy and the dynamic nature of the workloads. Some embodiments use different SSD cache management techniques and algorithms to meet the SLOs of the various workloads running on a hybrid store. For example, some embodiments use a region-based eviction control (RBEC) and some embodiments use a region-based admission control (RBAC). RBEC tries to continuously size the SSD tier on a per-workload basis by identifying the various phases, or "regions," of a workload. Then, a corresponding SSD cache size can be determined for each of these regions. In some cases, the RBEC tries to maintain or correct automatically ("auto-correct") the SSD cache size if the region of the workload changes. RBAC determines what data or metadata items should be admitted into the SSD tier while a workload is operating in a particular region, to make more optimal use of this scarce and expensive resource. In some cases, RBEC and RBAC processes/elements provide feedback to one another to satisfy (or attempt to satisfy) SLOs of all the workloads at the hybrid store layer.

The techniques introduced here can be embodied as special-purpose hardware (e.g., circuitry), or as programmable circuitry appropriately programmed with software and/or firmware, or as a combination of special-purpose and programmable circuitry. Hence, embodiments of the present invention may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In this description, the phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily all refer to the same embodiments.

FIG. 1 shows a block diagram of a storage system 100 in which some embodiments of the present invention can be implemented or utilized. In the embodiments shown in FIG. 1, storage system 100 includes a storage server 120 having one or more processors 122, a memory 124 with buffer cache 138, a network adapter 126, and a storage adapter 128 interconnected by an interconnect (bus) 125. The interconnect (bus) 125 can be or include one or more buses, point-to-point connections, bridges, controllers and/or adapters. The storage server 120 can be a server-class computer that provides storage services relating to the organization of information on writable, persistent storage media, such as SSDs and HDDs. The storage server 120 also includes a storage operating system 200 that implements one or more file systems to logically organize the stored data as a hierarchical structure of logical data containers (e.g., volumes, logical units, directories and/or files) on the electronic storage media (SSD) 140 and magnetic storage media (HDD) 150. The term "file system" does not necessarily imply the use or storage of "files" per se. Instead, file systems could be based on other types of units of data, including block-based storage.

The storage server 120 can be implemented using essentially any type of special-purpose computer (e.g., file server or storage serving appliance) or general-purpose computer embodied as, or having a storage server including a standalone computer or portion thereof. While FIG. 1 illustrates a monolithic, non-distributed storage server 120, various embodiments introduced here are also applicable to other types of storage configurations (e.g., cluster storage configurations). Moreover, the teachings of this description can be adapted to a variety of storage server architectures and techniques, including a NAS system, a SAN, or a direct-attached storage (DAS) system. The term "storage server" should therefore be taken broadly to include such arrangements including a storage server that provides file-based access to data, block-based access to data, or both.

Memory 124 includes storage locations that are addressable by the processor(s) 122 and adapters and can store software programs and data structures to carry out the techniques described herein. Processor(s) 122 and adapters may, in turn, include processing elements and/or logic circuitry configured to execute software programs and manipulate data. The storage operating system 200, portions of which is typically resident in memory 124 and executed by the processor(s) 122, functionally organizes the storage server by invoking storage operations in support of software processes executing on the server 120. The file system module (e.g., 240 in FIG. 2) of the operating system 200 allocates buffer cache 138 space in memory 124. The buffer cache 138 holds file system data that was recently accessed. Other important data structures of the operating system 200 are also resident in memory 124.

Other memory mechanisms, such as various computer-readable media, may instead be used to store and execute program instructions pertaining to the embodiments described herein. The electronic storage media 140 and magnetic storage media 150 are configured to provide a persistent, writable storage space capable of maintaining data in the event of a power loss or other failure of the storage server 120. Accordingly, the electronic storage media 140 and magnetic storage media 150 may be embodied as large-volume memory arrays.

The network adapter 126 includes circuitry and mechanical components needed to connect the storage server 120 to one or more clients 110A to 110N over a network 160, which may include a point-to-point (P2P) connection or a shared medium. Network 160 can be essentially any group of interconnected devices capable of exchanging information. For example, network 160 can be or include a local area network (LAN), a wide-area network (WAN), a metropolitan area network (MAN), a telecommunications network, a global area network (GAN) such as the Internet, or any combination thereof, and such network(s) can include wired and/or wireless networks.

A client 110 may be a general-purpose computer configured to execute one or more applications 112 that require network storage services, such as a database application. Moreover, a client 110 may interact with the storage server 120 in accordance with a client/server model of information delivery. That is, a client 110 may request the services of the storage server 120, and the storage server 120 may return the results of the services requested by the client 110, such as by exchanging packets over the network 160. A client 110 may issue packets including file-based access protocols such as the Common Internet File System (CIFS) protocol or Network File System (NFS) protocol over TCP/IP when accessing information in the form of files. Alternatively, the client(s) 110 may issue packets including block-based access protocols such as the Small Computer Systems Interface (SCSI) protocol encapsulated over TCP (iSCSI) and SCSI encapsulated over Fibre Channel Protocol (FCP) when accessing information in the form of LUNs or blocks.

The storage adapter 128 cooperates with the storage operating system 200 executing on the storage server 120 to access information requested by the client 110. The information may be stored on the electronic storage media 140 and magnetic storage media 150, which are illustratively embodied as SSDs 140 and HDDs 150. The storage adapter includes input/output (IO) interface circuitry that couples to the SSDs 140 and HDDs 150 over an IO interconnect arrangement, such as a conventional high-performance Fibre Channel serial link topology. The information is retrieved by the storage adapter 128 and, if necessary, processed by the processor(s) 122 (or the storage operating system 200) prior to being forwarded over the interconnect 125 to the network adapter 126 where the information is formatted into a packet and returned to the client 110.

As illustrated in FIG. 1, buffer cache 138 is a part of memory 124. Generally, a buffer cache memory, such as buffer cache 138, includes a smaller, lower-latency (faster) memory such as RAM (e.g., DRAM), operable to reduce the average time to perform a memory access. The buffer cache typically stores copies of the data from the most frequently used locations in memory 124 so that when a memory access is performed, the buffer cache may first be checked to determine if required data is located therein, and, if so, the data may be accessed from the buffer cache 138 instead of the persistent storage media, such as SSDs 140 or HDDs 150. In this manner, a buffer cache, such as buffer cache 138, reduces data access times by avoiding having to access persistent storage to obtain the data.

Figure 2:
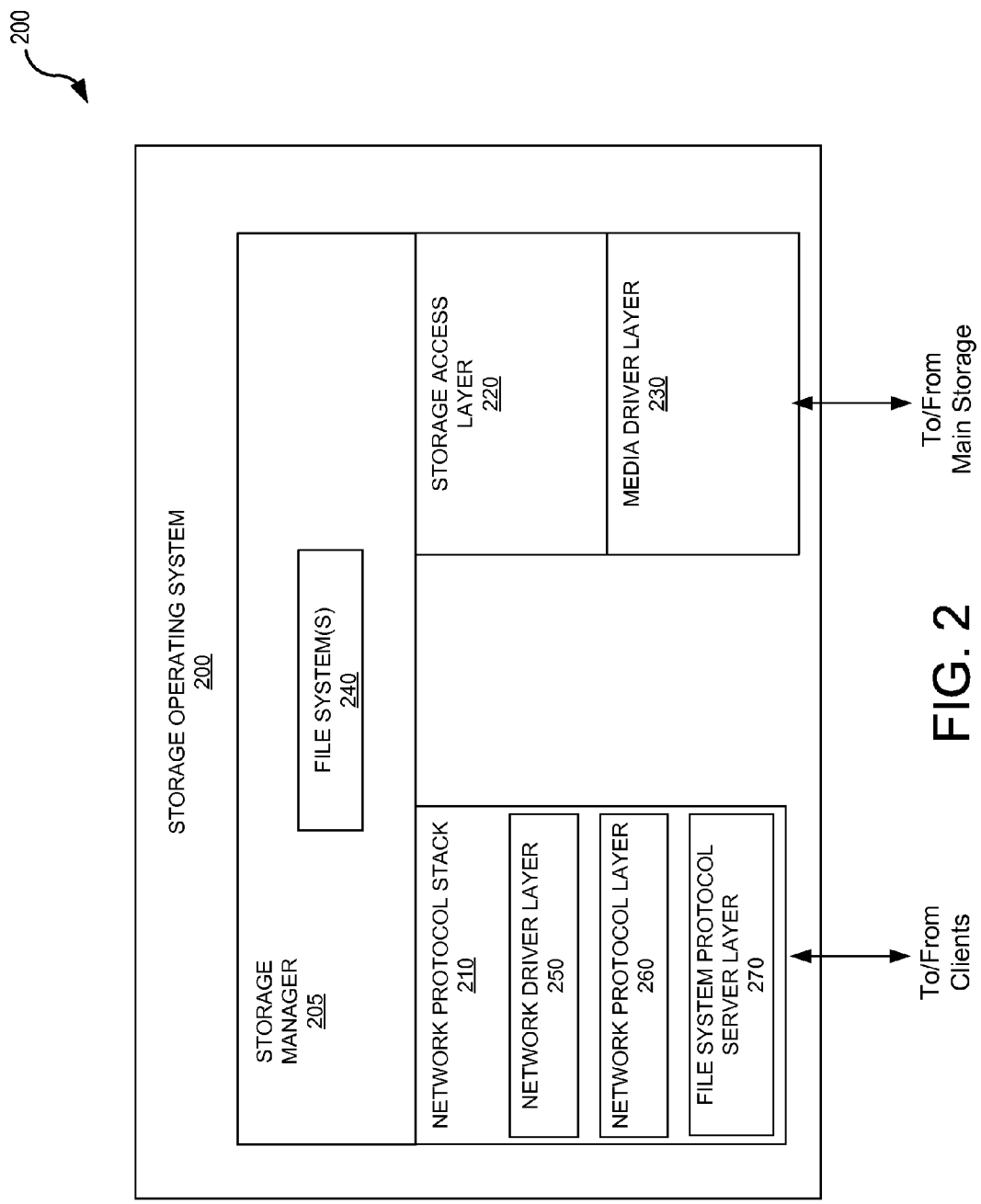
FIG. 2 shows a block diagram of a storage operating system.

FIG. 2 shows an example of the storage operating system 200. While FIG. 2 illustrates a storage operation system applicable to a monolithic, non-distributed system, other embodiments can have storage operation systems applicable to distributed storage systems (e.g., a cluster storage system); in such an embodiment the storage operation system may have similar structure and functionality to that shown in FIG. 2, although it may have a distributed architecture. As used herein, the term "storage operating system" generally refers to a subsystem that operates on a computer to perform storage functions that manage data access. The storage operating system may be embodied as special-purpose circuitry, programmable circuitry, or a combination thereof. In the case of programmable circuitry, the software and/or firmware used by the storage operating system can be implemented as a microkernel, an application program operating over a general-purpose operating system such as UNIX® or Windows NT®, or as a general-purpose operating system configured for the storage applications as described herein. In the illustrated embodiments, the storage operating system includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.).

In addition, the storage operating system 200 includes a storage access module, or "layer", 220 that implements a storage media protocol such as a Redundant Array of Independent Disks/Devices (RAID) protocol, and a media driver layer 230 that implements a storage media access protocol such as, for example, a Small Computer Systems Interface (SCSI) protocol. Any and all of the modules of FIG. 2 can be implemented as a separate hardware component. For example, the storage access layer 220 may alternatively be implemented as a parity protection RAID module and embodied as a separate hardware component such as a RAID controller.

Bridging the storage media software layers with the network and protocol layers is a storage manager 205 that implements one or more file system(s) 240. In one embodiment, the storage manager 205 implements data layout algorithms that improve read and write performance to the electronic storage media 140 and magnetic storage media 150. For example, storage manager 205 can be configured to perform initial placement and relocation of the data among multiple tiers of heterogeneous storage media of a hybrid storage aggregate and to allow clients to access any subsystems configured to perform the storage functions described herein.

The hybrid storage system can use non-volatile solid-state storage (NVSSS), such as flash or SSD, and/or Phase Change Memory (PCM) as a caching tier along with HDD as a permanent store. While PCM is relatively new, the storage industry already has various products, at different levels of the storage hierarchy, that utilize NVSSS to enhance performance and reduce the carbon footprint, thereby making greener data centers. Moreover, the hybrid store architecture can be adopted at different levels of the storage hierarchy. One example is the use of the hybrid store architectures as a host or server side cache. In this case, the host or server has a locally attached NVSSS, where it caches most frequently accessed data and metadata from the networked attached backend storage. A second example is a cache between the host and the backend storage. Another example is the use of the hybrid storage architecture with backend storage.

Figure 3:
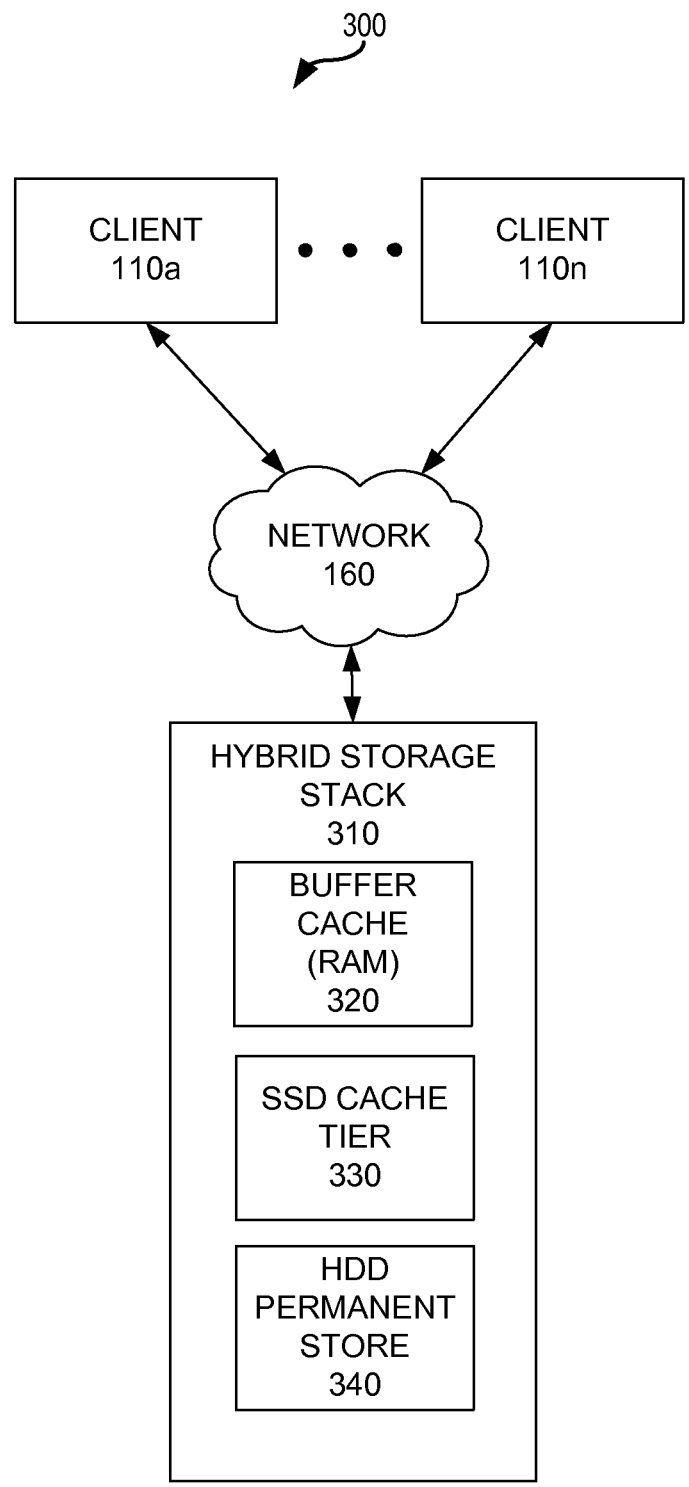
FIG. 3 shows a block diagram of a hybrid storage system.

FIG. 3 shows a block diagram 300 of a network storage system with hybrid storage stack 310. Clients 110a-110n may request the services of a hybrid storage system with hybrid storage stack 310 via network 160. The storage tiers in hybrid storage stack 310 are illustrated in FIG. 3 as buffer cache 320, caching tier 330, and permanent storage tier 340. Buffer cache (RAM) 320 is volatile and caches the file system data and metadata. When the caching tier 330 (e.g., an SSD tier) is used for read caching, the data that is evicted from buffer cache 320 is placed in the cache memory (e.g., SSD), based on admission rules. For example, if the rules indicate that the workload will not benefit from caching the evicted blocks in caching tier 330 because of workload characteristics or low SLO, the data blocks are evicted from buffer cache 320. On the other hand, if the workloads would benefit from caching, the data is inserted into the caching tier 330. Thus, in case of read caching, buffer cache 320 acts as a load generator for the cache tier 330 (e.g., an SSD cache).

Accordingly, in some embodiments, buffer cache 320 transforms the actual storage workload generated by an application. The load generated by the buffer cache 320 on behalf of a workload, W1, depends upon the incoming load of W1 (e.g., read requests per second and workload characteristics), the other competing workloads and the size of the buffer cache. The buffer cache hit ratio for a particular workload captures some of these parameters. The different incoming loads of a workload (i.e., the different working set sizes of the workload) are termed "regions" or "phases". Various embodiments identify the different regions of a workload in a highly dynamic storage system using statistics and the optimal SSD cache size to be allotted in that region such that the corresponding SLOs are met.

Figure 4A:
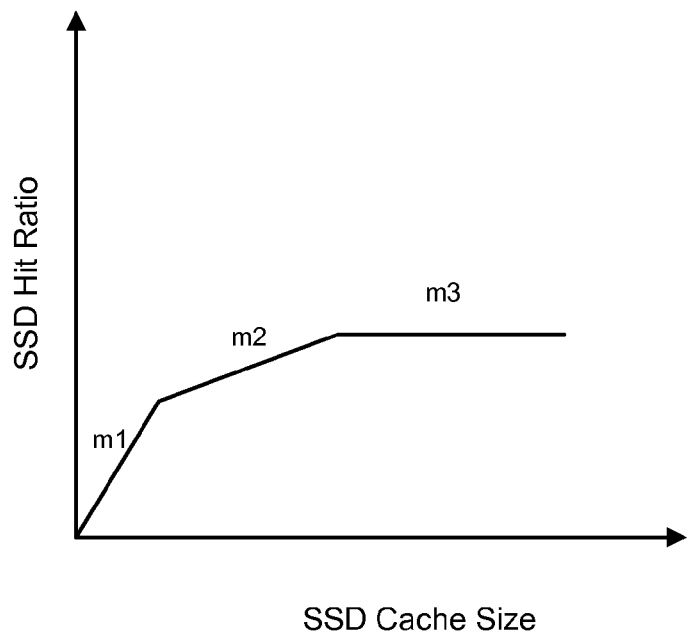
FIGS. 4A and 4B show graphs of a hit ratio as a solid-state device cache is increased.

FIG. 4A shows a graph of SSD hit ratio ($H_{ssd}$) as a solid-state device cache size is increased while keeping the buffer cache hit ratio ($H_{bc}$) constant for a particular workload. The workload in this graph is not constant and could be varying in intensity or load. The illustrations in FIG. 4A shows an example of the changes that can occur in the hit ratio as the cache size is increased. However, different workloads and applications will result in different responses in the hit ratio as the cache size is increased. FIG. 4A illustrates that as an SSD cache size increases, the hit ratio increases linearly with a slope $m_1$ and then flattens out with lower slopes $m_2$ and $m_3$. If either the workload W1 changes i.e., goes to a different region, or the load of other competing workloads change, the slope of the line for W1 changes to $m_2$, for example. These different slopes $m_1$ and $m_2$ depict the different regions of the workload W1.

Figure 4B:
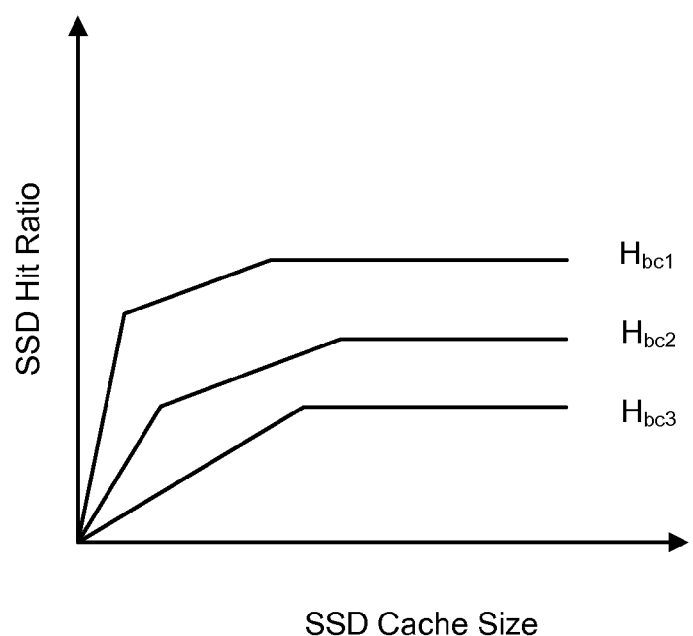

FIG. 4B is a graph similar to FIG. 4A but for different buffer cache hit ratios ($H_{bc}$) for a single workload. The graph represents one workload, W1, operating in different regions when experiencing different load generator ($H_{bc}$) from the buffer cache. The higher the buffer cache hit ratio for a workload, the less is the load on the SSD. Thus, if the workload remains constant, the SLO can be met with fewer SSD resources since most of the IOs will be honored by the buffer cache layer. One can generate similar graphs for each of the workloads operating on the system to gauge the improvement in SSD hit ratio and thereby the SLO of each of the workloads. Due to non-linear behavior of the workloads, the curves normally will not be a completely linear graph for a particular value of $H_{bc}$. However, various embodiments approximate the curve by piece-wise linear regions (e.g., $m_1$, $m_2$, $m_3$, etc).

Figure 5:
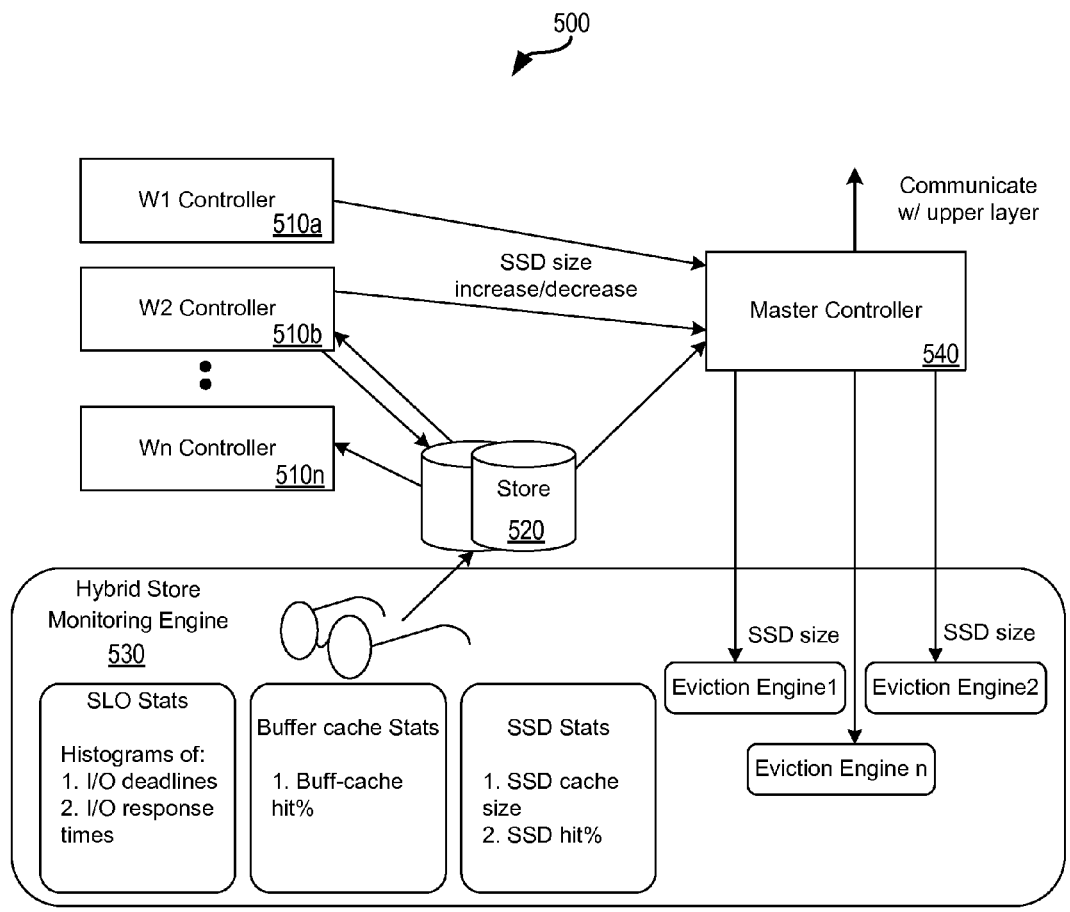
FIG. 5 is a block diagram illustrating interactions of components of a storage system with a master controller to control multiple workload controllers.

FIG. 5 illustrates an RBEC subsystem 500 that can be used in a hybrid storage system with a partitionable caching tier in accordance with the techniques introduced here. FIG. 5 shows several workload controllers 510a-510n, a data store 520, a hybrid store monitoring engine 530, and a master controller 540. These elements can be located within a storage server (e.g., storage server 120). In some embodiments, one or more of these components can reside within a storage manager such as storage manager 205 illustrated in FIG. 2.

The caching tier within a hybrid store (not shown in FIG. 5) can be implemented using caching schemes or algorithms such as, but not limited to, least recently used (LRU), least frequently used (LFU), clock, etc. In addition, the hybrid store has the capability to collect various statistics and tag each IO packet with expected deadline—e.g., based on the application's SLO (latency). Some embodiments of the RBEC subsystem 500 are based on the per-workload SSD hit ratio vs. SSD cache size.

As illustrated in FIG. 5, the RBEC subsystem 500 includes per-workload controllers 510a-510n that learn the different regions associated with a workload running on hybrid store. Each per-workload controller 510a-510n also learns the optimal SSD cache size that will meet the SLO of the workload when operating under the different regions. Later, each per-workload controllers 510a-510n determines the region in which the corresponding workload is operating and tries to attain the optimal SSD cache size as soon as possible to avoid SLO violations. In some embodiments, a per-workload controller 510a-510n can allocate more caching resources to a workload if the per-workload controller's hit ratio improves and SLO improves much more than expected—this will improve the media efficiency. Since each of the per-workload controllers 510a-510n has a localized view of only one workload, caching allocation requests are submitted to master controller 540 that has a global view of all the workloads managed by the subsystem 500 and overall SLO conformance.

Monitoring engine 530 monitors or collects statistics of each of the workloads every x seconds. This is referred to as the monitoring interval. In some cases, the monitoring engine 530 can include a daemon that resides within the hybrid store or the storage system, from where all the statistics are accessible. Examples of the types of statistics that can be monitored or collected by monitoring engine 530 include SLO statistics, buffer cache statistics, SSD cache statistics, and/or others.

SLO statistics can include the application's expected SLO and the observed SLO at the lower layer (i.e., hybrid store). The application's observed SLO at the hybrid store layer is different from the SLO set by the application. This is because the application request to read or write any data from the hybrid store has to pass through multiple layers in the system, some of which include the network stack (TCP/IP, UDP), protocol stack (CIFS/NFS), etc., and thereby experiences certain queuing delays Thus, these queuing delays have to be taken into consideration while setting the SLO expectation for a workload at the hybrid store layer. As a result, various embodiments tag the IO deadlines for each IO request and maintain a corresponding histogram—i.e., number of IOs with a deadline of less than 0 ms, 1 ms, 2 ms, etc. If an IO packet has a deadline of less than or equal to 0 ms, this means that there was significant queuing delay at the upper layers or the application level SLO is not set correctly. In such cases, master controller 540 will communicate to the upper layers as discussed in more detail below. Monitoring engine 530 calculates the weighted average of the deadline histogram which is then stored in the data store 520. This weighted histogram at the hybrid store layer is denoted as $l_{ex(wm,rn)}$ for workload m in region n.

The expected SLO at the hybrid store layer can change over time. For example, the change can be a result of the variations in the queuing delays at other layers, which in turn depend upon the overall load on the storage system i.e., peak vs. low NFS requests coming to the storage system. Hence, a point in time $l_{ex(wm,rn)}$ captures variations in the environment leading to more or less delays. Similarly, the response time or observed SLO is collected at per-IO granularity at the hybrid store layer and, for example, can be stored in a histogram. The weighted average of this response can be computed. Let the observed latencies of W1 be denoted as $l_{ob1}$. Note that if $(l_{ob1}-l_{ex1})>0$ then the SLO of W1 is not being met at the hybrid store layer. This information is transferred to the corresponding per-workload controller 510a-510n.

Buffer cache statistics can include the buffer cache hit ratio for each of the workloads. SSD cache statistics can include the SSD cache size utilized and corresponding SSD hit ratio for each workload. Let the current SSD cache size utilized by W1 be denoted as $s_{used1}$ and SSD hit ratio as $h_{ssd1}$. After collecting all these statistics for each of the workloads, monitoring engine 530 transfers these statistics to data store 520. The data store 520 can retain all the history of information about each of the workloads in a separate file. The history can include the statistics that are collected by the monitoring engine 530, and additional information which is calculated and learned by per-workload controllers 510a-510n.

In accordance with various embodiments, the per-workload controllers 510a-510n and/or the master controller 540 can be either outside or inside the hybrid store. As shown in the FIG. 5, one per-workload controller can be associated with each workload, such as W1 controller, W2 controller, etc. Each per-workload controller 510a-510n has a local view of the workload associated with the per-workload controller and can perform one or more tasks. For example, in some embodiments a workload controller 510a-510n can learn the different regions of a corresponding workload. A region of a workload is characterized by the buffer cache hit ratio, and the slope of the curve formed by SSD hit ratio vs. SSD size. This is denoted by ($h_{bc}$, m).

During the learning phase, the controller learns these values for different regions of a workload and the corresponding minimum SSD cache size such that the latency requirement at the hybrid store is met. The region information can be stored, for example, in a region table—one per workload. This table is stored on the data store 520. A workload could have millions of regions and this would increase the complexity of the algorithm and the size of the region table. Hence, various embodiments map ranges of these workload regions into a few manageable regions which are sometimes referred to as buckets. So, any random ($h_{bc}$, m) tuple will fall into a specific bucket. In one simple example, $h_{bc}$ in the range of 0-10% can be termed as $h_{bc1}$, 11-20% as $h_{bc2}$, etc. Thus, there will ten $h_{bc}$ buckets. Further, each $h_{bc}$ graph can be limited to a maximum number of slopes (e.g, three different slopes). Any random value of the slope will be approximated to any of these three slopes. Hence, for this example each workload would have a maximum of 30 regions. For better granularity, the number of $h_{bc}$ buckets and/or slopes can be increased—leading to an increased number of regions per-workload.

After determining the workload regions, the per-workload controller 510a-510n can retrieve the statistics from data store 520 and further determine if the operating region of the workload has shifted. If a determination is made that the operating region has shifted, then based on the prior learned values about the optimal SSD cache size, the workload controller submits a request to master controller 540 in an attempt to achieve that cache size as soon as possible.

Another example of a task that can be performed by a per-workload controller 510a-510n is communication with an RBAC subsystem. In these cases, the per-workload controller interacts with the RBAC subsystem to help an admission engine adapt to the region changes by managing what data or metadata should be cached.

In some embodiments, the per-workload controller 510a-510n uses an appropriate number of samples (e.g., a prespecified minimum number) from the monitoring engine 530 before making a correct judgment. As a result, the per-workload controller can be placed in a lower power state (e.g., a sleep state) for some amount of time, which is usually a multiple of monitoring interval (x). For example, suppose t samples of the statistics are desired before the per-workload controller determines the region, then the controller sleeps for (t*x) seconds and then wakes up to check if the workload is meeting its SLO. This sleeping interval is referred to as the action window.

At the end of the action window time, the per-workload controller 510a-510n looks at all the t samples, and places them in appropriate buckets based on the $h_{bc}$ value. For example, samples with $h_{bc}$ in the range of 0-10% in a first bucket, 11-20% in second bucket, and so on and so forth. A determination can then be made as to which bucket has the maximum number (or x %) of samples. The samples which lie in the majority bucket are selected and the rest are discarded. The selected samples are used to either determine or learn the region of the workload. For each of the selected samples, the slope (e.g., as illustrated in FIG. 4A) is calculated by the following formula:

Slope (m)=ssd utilized/ssd-hit ratio

The average slope (m) is calculated for all these samples to derive a region tuple $<h_{bc}, m>$. The region tuple can be approximated by the bucket of regions. If a matching range is found, then the SSD size value to size the cache partition can be used. If the region entry is not found or missing, then the optimal SSD size can be calculated, for example, using equations (1), (2) and (5) described below. If the SLO is not being met, the new SSD size can be applied and a determination can be made whether the SLO is met in the next iteration. If the SLO meets the expectation, the appropriate size of the SSD for that region can be recorded so the entry can be used in the future.

To illustrate the how various embodiments may use the per-workload controllers, consider the following example where the following notations are used:

$h_{bc(wm)}$—Buffer cache hit ratio seen by workload m.
$h_{ssd(wm)}$—Hit ratio of the SSD as seen by workload m.
$h_{disk(wm)}$—Hit ratio of the disk as seen by workload m.
$s_{used(wm,rn)}$—Amount of SSD actually used up by a workload m when operating in region n.
$s_{optimal(wm,rn)}$—Optimal amount of SSD for a workload m when at region n.
$l_{ex(wm,rn)}$ Expected response time (latency) for workload m when operating in region n
$l_{ob(wm,rn)}$ Observed response time (latency) for workload m when operating in region n
$l_{bc}$—Response time (latency) of the buffer cache (e.g., this can be zero).
$l_{ssd}$—Response time (latency) of the SSD (e.g., from the manufacturer's specifications).
$l_{disk}$—Response time (latency) of the disk (e.g., from the manufacturer's specifications).
$m_{(wm,rn)}$—Slope of the line $h_{ssd}/s_{used}$ of workload m when operating in region n. Note that the slope=0, when $h_{ssd}$ becomes constant even when $s_{used}$ is increasing.

The following equations represent known relationships between the quantities defined above:

$$h_{bc}+h_{ssd}+h_{disk}=1 \quad (1)$$

In a multi-tier environment, the expected latency above the buffer cache ($l_{ex}$) will be $$l_{ex}=l_{bc}*h_{bc}+l_{ssd}*h_{ssd}+l_{disk}*h_{disk} \quad (2a)$$

As $l_{bc}=0$, formula (2a) becomes $$l_{ex}=l_{ssd}*h_{ssd}+l_{disk}*h_{disk} \quad (2b)$$

Assume that there are multiple workloads running on the hybrid store, such as W1, W2, . . . Wn. In some embodiments, all the per-workload controllers 510a-510n can operate using the same algorithm such that each could be considered a separate process. While W1 controller is running, the workload load intensity, characteristic of any of the workloads in the pool (W1 through Wn) can change. Further, assume that while W1 is operating at a particular $h_{bc(w1)}$ value, for example 0.5, it will internally have one or more regions characterized by $l_{ex(w1,rn)}$ and $m_{(w1,rn)}$. In accordance with some embodiments, assume there is minimum amount of SSD allotted to W1 partition denoted by $s_{alloc(w1)}$. This minimum amount is configurable by master controller 540. The monitoring engine 530 collects the statistics mentioned above every x secs (configurable), and inserts it in the data store 520 in time-series format: $<h_{bc(w1)}, h_{ssd(w1)}, s_{used(w1, rn)}, l_{ex(w1, rn)}, l_{ob(w1, rn)}>$.

Since the W1 controller transitions from the sleep state to a waking state after t samples are collected i.e., tx secs, the data store will have t such time-series tuples: $<h_{bc(w1)1}, h_{ssd(w1)1}, s_{used(w1,rn)1}, l_{ex(w1,rn)1}, l_{ob(w1,rn)1}>, <h_{bc(w1)2}, h_{ssd(w1)2}, s_{used(w1,rn)2}, l_{ex(w1,rn)2}, l_{ob(w1,rn)2}>, \ldots <h_{bc(w1)t}, h_{ssd(w1)t}, s_{used(w1,rn)t}, l_{ex(w1,rn)t}, l_{ob(w1,rn)t}>$. The value of t can either be configuration parameter or adaptively set based on the amount of SSD allotted to the workload, and the time needed to warm up that amount of cache. At the end of tx seconds (i.e., action window), the W1 controller wakes up. The per-workload controller 510a-510n places the samples lying in different ranges of $h_{bc}$ into different buckets. The per-workload controller then figures out which bucket has the maximum or x % of the total samples, where x % is a configurable parameter. If no bucket has at least x % of total samples a determination is not made about a specific region from these samples, as the data is highly dispersed.

If the average $(l_{ob(w1,rn)}-l_{ex(w1,rn)})>0$, then a determination is made that the SLO is not being met. Since the per-workload controller is not aware of the region, and the data has a lot of variations, a check is made to determine if $s_{used(w1,rn)}< s_{alloc(w1)}$. If yes, then the per-workload controller does nothing and assumes the minimum amount of SSD allotted above, as the SSD is not warmed up completely. If $s_{used(w1,rn)}$ is not less than $s_{alloc(w1)}$, the per-workload controller monitors for consecutive readings. If for consecutive readings the per-workload controller determines that $h_{ssd(w1)}$ is improving with increases in $s_{used(w1,rn)}$, then the SSD allocation to W1 ($s_{alloc(w1)}$) is increased by some fixed amount. Otherwise $s_{alloc(w1)}$ remains unchanged and the minimum allocation is assumed. Note that fixed amount can be a configurable parameter or an estimate from the SSD working set (i.e., number of SSD blocks re-referenced x times during a time period). In some embodiments, if the monitoring infrastructure has the capability to keep a histogram of the reference counts, the per-workload controller can use this information to determine the fixed amount.

The selected number of samples available to the controller for estimation, $t^+$, are less than or equal to t. Each of the $t^+$ samples are augmented with the slope ($m_{(wn,rn)}$) calculation, where $m_{(w1,rn)t}=h_{ssd(w1)t}/s_{used(w1, rn)t}$, for any sample number t. Then, the average and standard deviation of $m_{(wn, rn)}$, $l_{ex(w1, rn)}$, and $l_{ob(w1,rn)}$ can be calculated and denoted as $m_{(w1, rn)av}$, $m_{(w1, rn)std}$, $l_{ex(w1, rn)av}$, $l_{ex(w1, rn)std}$, $l_{ob(w1, rn)av}$, $l_{ob(w1, rn)std}$, respectively. Sometimes, $l_{ex(w1, rn)}$ can be less than or equal to zero, because of queuing delays at the upper layers or very stringent SLO expectation of the application. In accordance with some embodiments, such $l_{ex(w1,rn)}$ entries are treated as outliers and are not considered for calculation of the average and standard deviation. Those samples, however, can still be used for learning the values of $m_{(w1, rn)}$ and $l_{ob(w1,rn)}$. If a maximum number of entries have $l_{ex(w1,rn)}$ values less than or equal to zero, then the W1 controller contacts the master controller, which communicates this to the upper layer. In this case, the W1 controller will not be able to meet the SLO.

Using the W1 region table, the associated entry for (hbc(w1)av,m(wn, rn)) is retrieved. If a matching entry is found, this region was previously discovered and the controller is seeing this region again. If the region is not found, the optimal SSD size is calculated. If the region is found in the table, let x denote that—i.e., region-id. If lex(w1, rnJav<=lob(w1, rn)av, i.e., not meeting SLO, then perform the following: 1) if Salloc(w1)<Soptimal(w1, rx), W1 controller 510a informs master controller 540 that a SSD cache resize is needed; 2) if Salloc(w1)>=Soptimal(w1, rx), but Sused(w1, rn)av<Salloc(w1), then the allotted space is not used up completely and the W1 controller can sleep for tx seconds; 3) if the used space is equal to allotted space, determine the maximum hit ration to see if something has changed, otherwise, inform RBAC subsystem that the workload is not able to benefit from SSD caching. Various embodiments inform the RBAC subsystem about region x of W1.

While in region x, if $l_{ex(w1, rn)av}$>$l_{ob(w1, rn)av}$, then SLO is exceeding expectations and the per-workload controller 510a informs master controller 540 that an SSD cache resize is needed. Master controller 540 can, for example, shrink W1's cache if required. Applying equations (1) and (2), to get the maximum $h_{ssd(w1)}$ i.e., $h_{ssd(w1)max}$ that will help meet $l_{ex(w1, rn)av}$, during $h_{bc(w1)av}$. Substituting equation (1) into equation (2) yields:

$$h_{ssd(w1)max} = (l_{disk}*(1-h_{bc(w1)av})-l_{ex(w1,rn)av})/(l_{disk}-l_{ssd}) \quad (4)$$

Using this information, various embodiments of master controller 530 calculate the optimal SSD size required to meet this $h_{ssd(w1)max}$ when W1 is operating in slope falling in the range $(m_{(w1, rn)av}-m_{(w1, rn)std})$<=$m_{(w1, rn)av}$<=$(m_{(w1, rn)av}+m_{(w1, rn)std})$. In accordance with some embodiments, the optimal SSD size $s_{optimal(w1, rn)}$ can be calculated as follows:

$$s_1 = h_{ssd(w1)max}/m_{(w1,rn)av} \quad (5)$$

$$s_2 = h_{ssd(w1)max}/(m_{(w1,rn)av}-m_{(w1,rn)std}) \quad (6)$$

$$s_3 = h_{ssd(w1)max}/(m_{(w1,rn)av}+m_{(w1,rn)std}) \quad (7)$$

$$s_{optimal(w1,rn)} = \max(s_1, s_2, s_3) \quad (8)$$

Equation (8) will actually reduce to $s_{optimal(w1, rn)} = s_2$. In some embodiments, master controller 540 can conservatively allocate slightly more SSD storage space than required, so that there is some more space to handle SLO violations. If $l_{ex(w1, rn)av}$<$l_{ob(w1, rn)av}$, i.e., if the SLO is not met, and $s_{alloc(w1)}$<$s_{optimal(w1, rn)}$, then the per workload controller, e.g., 510a, needs to wait for the cache partition to warm up. In this case, the per workload controller sleeps for tx seconds and takes corrective steps in the next iteration. On the other hand, if $s_{used(w1)}$>=$s_{optimal(w1, rn)}$, then either the workload is not able to benefit from SSD caching or the correct blocks are not cached (i.e., there is some problem with the admission control). In either case, the W1 controller informs, or feeds back, this information to RBAC and the master controller and the per-workload controller sleeps for tx seconds before reevaluating the new data.

If $l_{ex(w1, rn)av}$>=$l_{ob(w1, rn)av}$, i.e., if the SLO is met or is above expectation, then the per-workload controller obtains the maximum $h_{ssd(w1)}$ from the t+ samples—denoted by $h_{ssd(w1)maxob}$. If ($h_{ssd(w1)maxob}$>$h_{ssd(w1)max}$), then W1 is able to benefit from caching and the current SSD hit ratio is more than is needed to meet the SLO. As a result, the per-workload controller can do either of the following: a) It can reduce the $h_{ssd(w1)}$ to $h_{ssd(w1)max}$, by shrinking the SSD size as this will help the other workloads use up the free space of the SSD is required. In this case, the minimum amount of SSD, $s_{used(w1,rn)min}$ corresponding to $h_{ssd(w1)max}$ are obtained. The previous calculation of $s_{optimal}$ in equation (8) can be reused. Thus, $s_{optimal(w1,rn)} = \max(s_{used(w1,rn)min}, s_{optimal(w1,rn)})$. Alternatively, b) it can update $s_{optimal(w1,rn)}$, but keep more SSD with W1 to improve media efficiency. Master controller 540 can arbitrate and shrink the W1's cache partition if some other workload requires additional caching resources. In this case, an entry about the region can be made in the region table and the per-workload controller can inform the master controller 540 that the SSD cache needs to be resized.

An entry corresponding to this new region n can be made as a row $h_{bc(w1)av}$, $l_{ex(w1, rn)av}$, $m_{(w1,rn)av}$, $m_{(w1,rn)std}$, $s_{optimal(w1, rn)}$ in W1's region table that is stored in the data store 520. These entries can be accessed in the future, when the learning phase is over and the per-workload controller wants to determine the optimal SSD size corresponding to a region. Note that combination of $h_{bc(w1)av}$, $m_{(w1, rn)av}$ and $l_{ex(w1, rn)av}$ determines a region. If $s_{optimal(w1, rn)}$ is not equal to $s_{alloc(w1)}$, then the SSD cache size need to increase or shrink. If entry corresponding to the region is found in the region-table, the $s_{alloc(w1)}$ is set according to the region-table entry by the master controller 540. If no entry is found, the per workload controller learns about this new region and makes an appropriate entry into the region table.

All the SSD cache sizing requests from the per-workload controllers 510a-510n go through master controller 540. Master controller 540 has a global view of all the workloads—i.e., observed and expected SLO, how much SSD is allotted, how much SSD is actually used by a workload, and the region in which a workload is operating. Master controller 540 solves a decision problem for allocating the caching resources such that most of the workloads meet their SLO. If the caching tier is completely exhausted, a determination needs to be made as to which cache partition to shrink based on priority and overall SLO of the system before picking up the cache partition to shrink.

The following is an example algorithm for master controller 540. As seen in the previous algorithm, the per-workload controller has a local view and submits SSD cache re-sizing requests to master controller 540. In some embodiments, master controller 540 has access to the following information about each of the workloads: 1) present or current region information (e.g., $l_{ex(w1,rn)}$, $l_{ob(w1,rn)}$, $m_{(w1, rn)}$, $s_{optimal(w1, rn)}$), 2) priority of the workload ($p_{(w1)}$), and 3) current allotted SSD space ($s_{alloc(w1)}$). The master controller 540 maintains the above information about the workloads in either of the following three sets: 1) workloads just meeting the SLO i.e., $l_{ex(w1,rn)} = l_{ob(w1,rn)}$; 2) workloads exceeding the SLO expectation i.e., $l_{ex(w1,rn)} > l_{ob(w1,rn)}$; or 3) workloads not meeting SLO i.e., $l_{ex(w1,rn)} < l_{ob(w1,rn)}$. During the lifetime of a workload, the status will move between these sets depending upon whether the SLO is being met or not. Each of the sets are sorted according to the $p_{(wn)}$. At any point in time, one or more of these sets can be empty.

Let the total SSD space available be denoted by $s_{total}$ which can be represented by the following mathematical constraint $$\Sigma_i s_{alloc(wi)} \leq s_{total} \qquad (9)$$

Various embodiments of the master controller use a process that maximizes SLO compliance (e.g., by maximizing the number of workloads meeting SLO expectations or based on a prioritization of the workloads). If W1 is meeting or exceeding the corresponding SLO i.e., it is part of the set of workloads just meeting the SLO or the set of workloads exceeding the SLO expectation, check if the set of workloads not meeting SLO is empty. If yes, then let W1 operate with more SSD, since all the workloads are meeting the corresponding SLOs. In this case, $s_{alloc(w1)} \geq s_{optimal(w1, rn)}$. If Set3 is not empty, there are some workloads waiting for SSD to be released. The excess space is distributed to the suffering workloads in order of their priority, i.e., from higher priority to lower priority. For example, if W2 needs additional caching resources, then: a) set free_space=$s_{alloc(w1)} - s_{optimal(w1)}$; b) set $s_{alloc(w1)} = s_{optimal(w1)}$ as this will issue a SSD cache shrink to W1's eviction engine; c) if (free_space $\leq (s_{optimal(w2)} - s_{alloc(w2)})$, then $s_{alloc(w2)} = s_{alloc(w2)}$+free_space; d) else set $s_{alloc(w2)} = s_{optimal(w2)}$ and free_space=free_space$-(s_{optimal(w2)} - s_{alloc(w2)})$. Repeat steps c and d for other suffering workloads in order of decreasing priority.

If W1 is not meeting its SLO and $s_{optimal(w1, rn)} > s_{alloc(w1)}$, let the required amount be $s_{req(w1)}$, the master controller 540 will perform the following: a) if $\Sigma_i s_{alloc(wi)} < s_{total}$, and $(s_{total} - \Sigma_i s_{alloc(wi)}) \geq s_{req(w1)}$, then provide the space from the SSD; b) if $\Sigma_i s_{alloc(wi)} < s_{total}$, and $(s_{total} - s_{alloc(wi)}) < s_{req(w1)}$, then provide the available space from SSD, and the remaining space from (c); c) if $\Sigma_i s_{alloc(wi)} = s_{total}$, then check if Set2 has some workloads, such as W2 and W3, that have excess SSD space, then shrink SSD cache allocation to workloads W2 and W3 and reallocate the resource to W1. If the $s_{req(w1)}$ is satisfied then exit, else it means that set of workloads exceeding the SLO expectation is empty, but the set of workloads meeting the SLO expectations is not empty—go to next step; d) If W1 has priority $p_{(w1)}$, select one or more workloads from set of workloads meeting the SLO expectation, with priority less than $p_{(w1)}$ and shrink their caches proportionally, while increase W1's share. Thus, lower priority workloads will suffer at the expense of higher priority workloads meeting their SLO; e) If there is no workload with a priority lower than $p_{(w1)}$ in the set of workloads exceeding the SLO expectation, then master controller 540 terminates the attempt to reallocate and informs the layer above it—i.e., SLO conformance at a higher layer. In some embodiments, master controller 540 interacts with the eviction engines of the workloads to size the SSD cache partition correctly—(a) workload whose cache has to be increased and (b) workload whose cache size has to be decreased to benefit (a).

Figure 6:
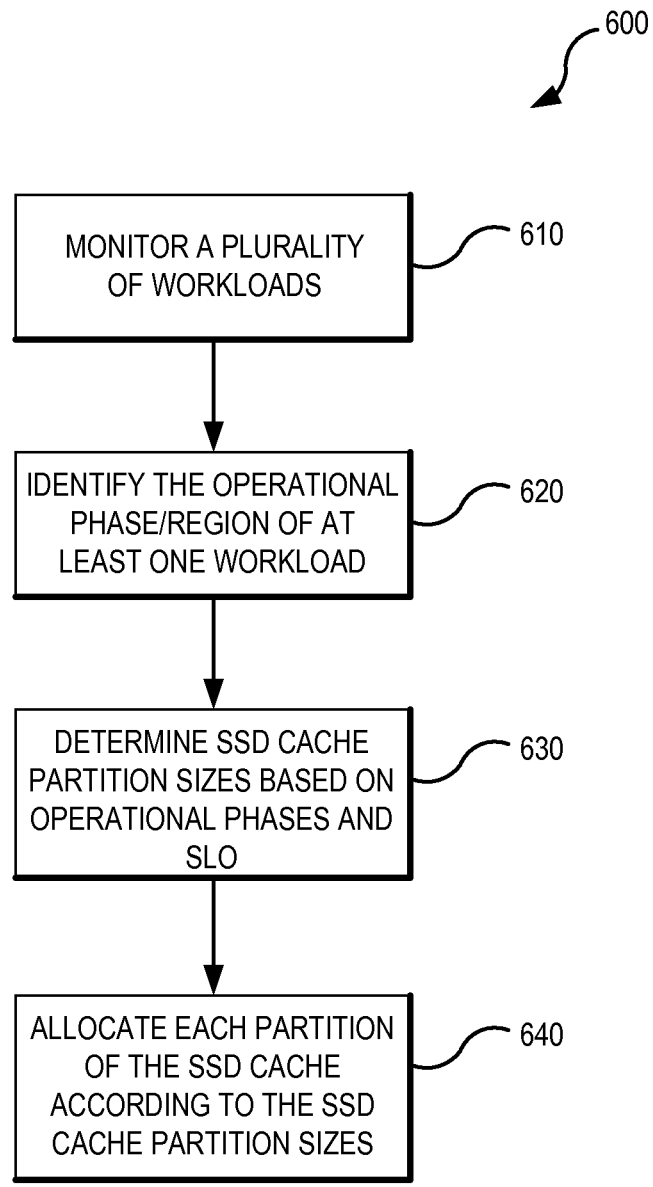
FIG. 6 is a flow chart illustrating a process for allocating cache partitions.

FIG. 6 is a flow chart illustrating a process 600 for allocating cache partitions. One or more of the operations described within this process can be performed, for example, by monitoring engine 530, a workload controller 510*a*-510*n*, and master controller 540. In the embodiments illustrated in FIG. 6, monitoring operation 610 monitors a plurality of workloads, such as W1-Wn. Identification operation 620 uses the information about the plurality of workloads obtained during monitoring operation 610 to identify the operational phase/region of at least one of the workloads. This can be done, for example, using the region table created during the workload learning phase discussed above in FIG. 5. Determination operation 630 determines the corresponding SSD cache size for each workload based on the operation phases and SLOs. For example, the region table may be used to access a desired cache allocation size based on the operating region. Then, allocation operation 640 allocates each partition of the SSD cache in accordance to the SSD cache size partitions determined by determination operation 630 if enough caching resources are available. If enough caching resources are not available, a determination is made about which partitions should be reallocated in order to meet system level priorities and/or comply with the most SLOs.

Figure 7:
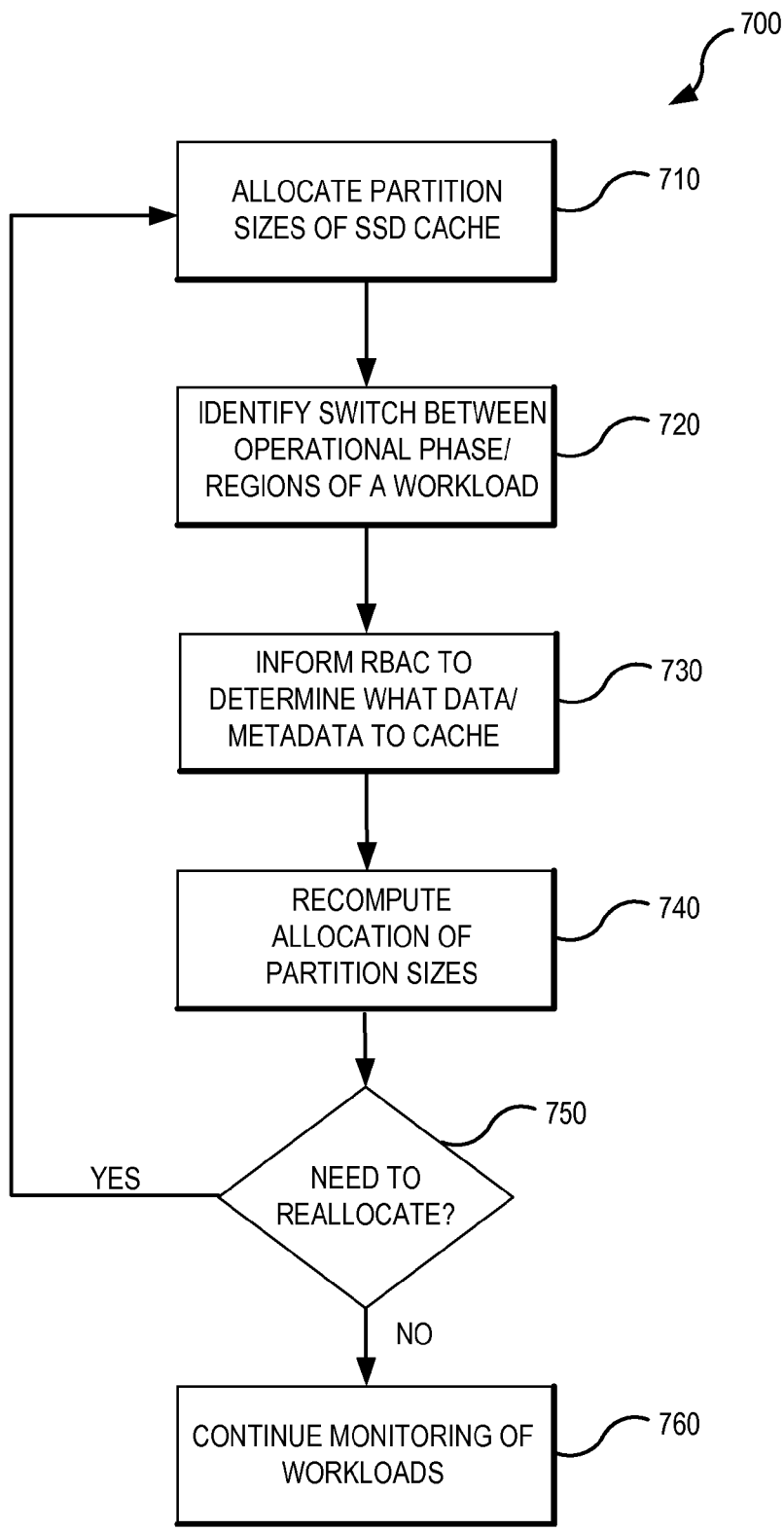
FIG. 7 is a flow chart illustrating a process for allocating cache partitions based on identified operational regions of a workload.

FIG. 7 is a flow chart illustrating a process 700 for allocating cache partitions based on identified operational regions of a workload. The operations described within this process can be performed, for example, by a workload controller 510*a*-510*n* and master controller 540. Allocation operation 710 allocates partitions of the cache (e.g., an SSD cache) for each workload. In some embodiments, the initial allocation is based on a minimum cache size for each workload. In other embodiments, the initial allocation will be an even distribution of the caching resources.

Identification operation 720 monitors for switches between operational phases/regions of a workload. The switch between operation phases/regions may be communicated, during communication operation 730, to the RBAC where a determination is made what data/metadata should be cached. Resizing operation 740 then determines a new allocation of the cache partitions and determination operation 750 determines if there is a need to reallocate. If a determination is made that there is a need to reallocate, determination operation 750 branches to allocation operation 710 where the partitions of the cache are appropriately reallocated. If determination operation 750 determines there is no need for reallocation, determination operation 750 branches to monitoring operation 760 where the workloads are monitored for SLO compliance and changes in operational phases.

For example, suppose workload W1 changes from a first operational region to a second operational where the corresponding cache partition size decreased. This could free up caching resources for other workloads. A decision can be made by determination operation 750 as to whether the newly available caching resources will result in a benefit (e.g., in complying with SLOs of the system) if reallocated. As another example, in some embodiments, determination operation 750 determines if the difference in the requested cache size and the current partition size is greater (in absolute value) than a predetermined amount. When the difference is greater than the predetermined amount, determination operation 750 branches to allocation operation 710. When the difference is less than or equal to the predetermined amount, determination operation 750 branches to monitoring operation 760. If a switch in regions is detected during identification operation 720, the switch can also be communicated to RBAC during communication operation 730, so that appropriate data content is admitted into the SSD tier.

Figure 8:
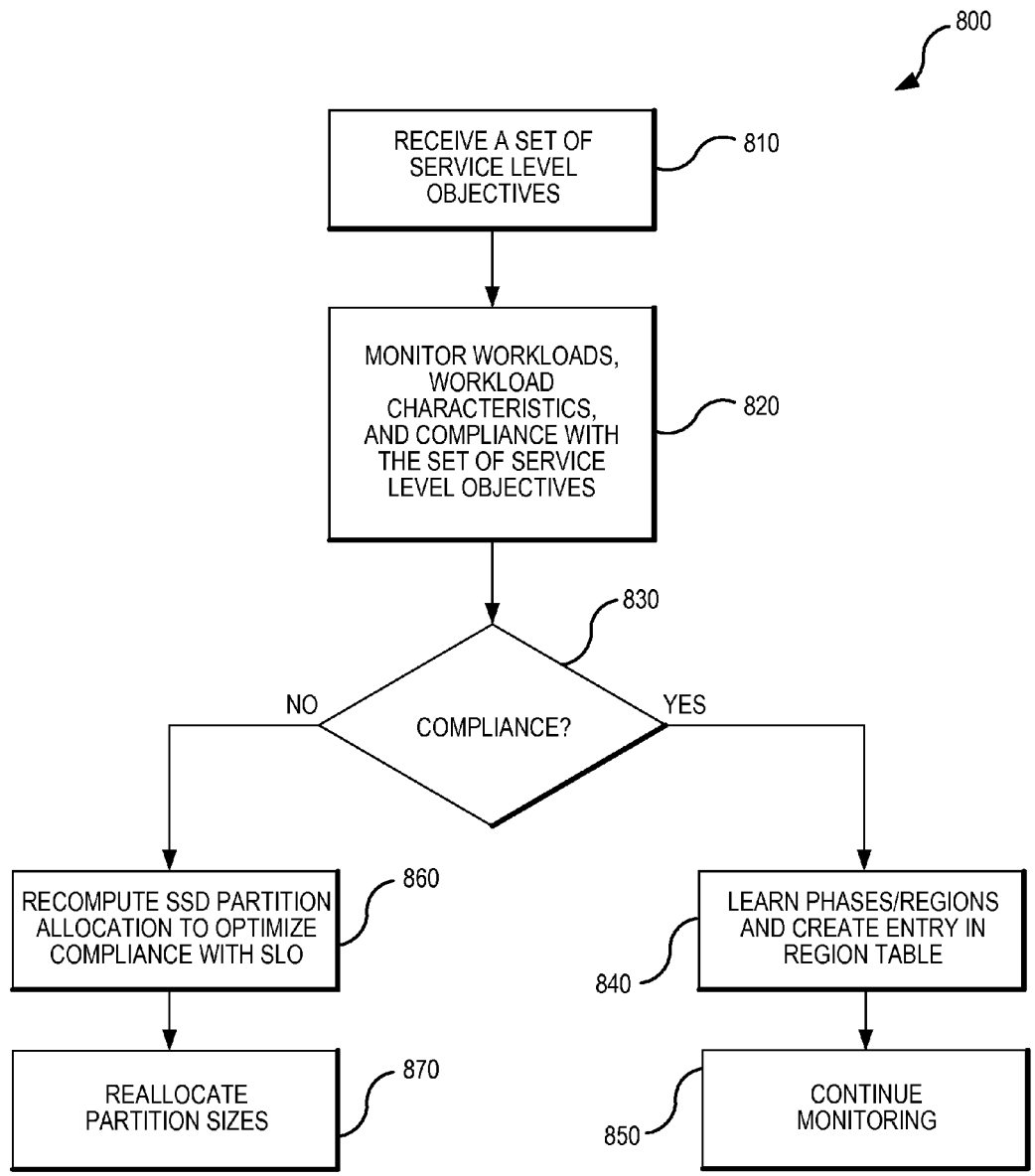
FIG. 8 is a flow chart illustrating a process for allocating cache partitions based on compliance with service level objectives.

FIG. 8 is a flow chart illustrating a process 800 for allocating cache partitions based on compliance with SLOs. The operations described within this process can be performed, for example, by a workload controller 510*a*-510*n*, monitoring engine 530, and/or master controller 540. As illustrated in FIG. 8, a set of SLOs are received during receiving operation 810. Monitoring operation 820 monitors the workloads, the workload characteristics, and SLO metrics. This information can be used in determining compliance during determination operation 830. If determination operation 830 determines the system is in compliance with all of the SLOs received during receiving operation 810, then determination operation 830 branches to learning operation 840 where the phases/regions are identified (i.e., learned). In some embodiments, learning operation 840 can make an entry in a region table about the region and the optimal SSD size associated with that region. Once completed, continue monitoring operation 850 continues monitoring the workloads. If determination operation 830 determines the system is not in compliance with all of the SLOs, determination operation 830 branches to computation operation 860 where the SSD partition allocation sizes are recomputed to optimize compliance with the SLOs. Using the recomputed allocation sizes, allocation operation 870 reallocates the cache partitions.

Figure 9:
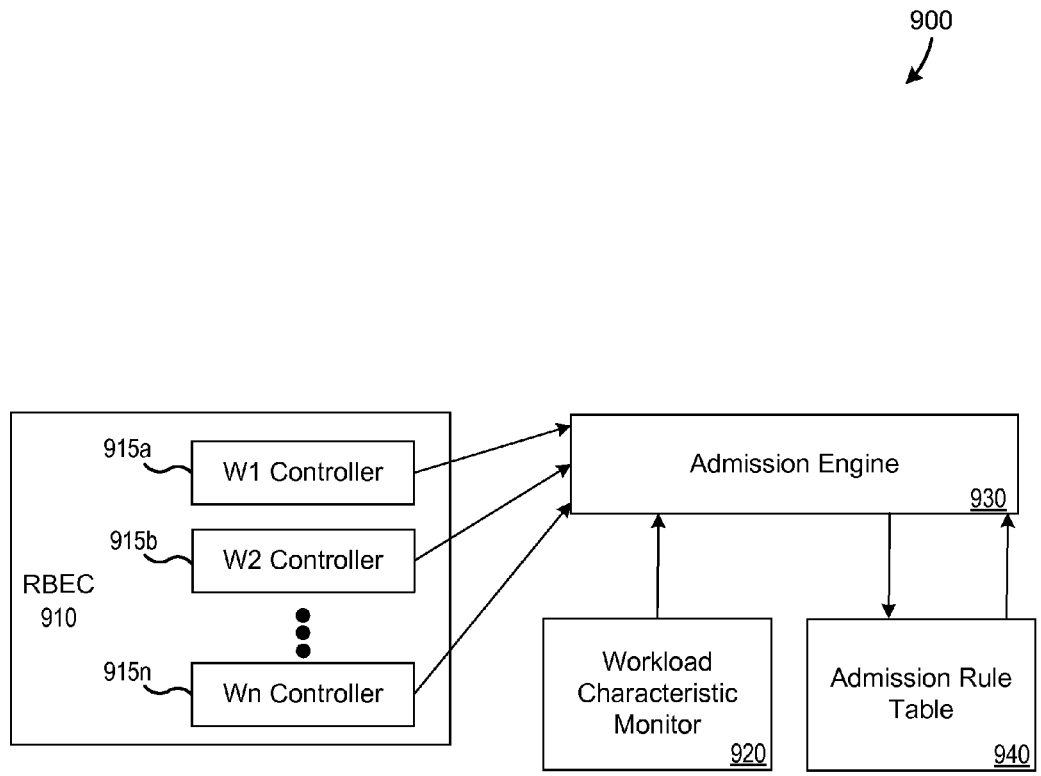
FIG. 9 is a block diagram illustrating components of a region based admissions controller.

FIG. 9 is a block diagram illustrating components of a RBAC subsystem 900. In accordance with various embodiments, RBAC subsystem 900 optimizes the use of SSD cache partition allotted to a workload with appropriate data content, such that the corresponding SLO improves. RBAC subsystem 900 can adapt to changes in the workload characteristics, regions, and working set by controlling the admission rules corresponding to a workload. As illustrated in FIG. 9, RBAC subsystem 900 includes a RBEC subsystem 910, a workload characteristic monitoring engine 920, an admission engine 930, and an admission rule table 940.

Admission engine 930 is responsible for determining which data or metadata blocks belonging to a workload should be placed in the SSD or not. Admission engine 930 is consulted whenever buffer cache is evicting the buffers. In turn, admission engine 930 uses the admission rule table, which contains rules at a per-workload granularity. If a corresponding rule entry is found for that workload and its region, and if the evicted buffer cache block falls in the same category (i.e., metadata/data) then it is cached in the SSD. Otherwise, the data block is simply evicted and thrown away from the buffer cache.

In accordance with various embodiments, the rule table contains rows with information as follows:

<Rule ID, Workload ID, Region ID, Metadata/Data, Start Block number, End Block number>

In the rule entry, rule ID is unique rule identity, workload ID is the identity of the workload, region ID is the identification of a particular phase of the workload. A workload can have more than one region which can be identified with a unique ID, called a region ID. As stated earlier, region ID is a unique ID associated with the tuple $<h_{bc(w1)av}, m_{(w1, m)av}$ and $l_{ex(w1, m)av}>$. The metadata/data column signifies whether the information is about metadata or data. The start and end block numbers signify the starting and ending HDD block numbers that are cacheable in that region. If the start and end block numbers are both zeroes and the entry is for metadata, for example, then all the metadata belonging to the corresponding workload should be cached in the SSD.

In traditional hybrid store systems, the rule table is mostly static—i.e., the rules are set based on the user's prior knowledge about the workload. In contrast, various embodiments provide techniques which build or refine the admission rules depending upon the workload region. The admission engine 930 is responsible for refining these rules with the help of RBEC 910 and workload characteristic monitoring engine 920. This helps the admission engine 930 adapt to the changes in the workloads, thereby using the SSD partition space optimally.

The workload characteristic monitoring engine 920 can include a monitoring daemon that collects workload characteristics of each of the workloads and informs the admission engine about the workload characteristics. These workload characteristics are inputted into admission engine 930 and help in refining the admission rule entries. For example, if admission engine 930 observes that a workload is issuing completely sequential read requests with no re-references, then it can switch off SSD caching for that workload. This is because data is cached in the SSD only after being evicted from the buffer cache. In case of sequential read requests, although the data will be evicted from the buffer cache, the data will never be referenced. Hence, the SSD cache will get polluted due to such workloads.

The per-workload controllers 915*a*-915*n* of RBEC subsystem 910 provide the region information i.e., region ID input to the admission engine 930. Using the region information from RBEC subsystem 910 and the workload characteristic from the workload characteristic monitoring engine 920, admission engine 930 can modify the rules, if required. The region input (Region ID) also helps admission control to choose between different rules belonging to a workload depending upon the region in which the workload is operating. For example, if workload W1 has two regions that are identified; in one region it makes sense to just cache metadata, while in the second region caching both data and metadata helps improve SLO. Thus, the admission control can make use of which region W1 is operating in to choose or multiplex between these two rules, and adapt to the changes quickly.

In the RBAC subsystem architecture used by some embodiments, only the eviction control subsystem (i.e., RBEC subsystem 910) is aware of the SLO conformance of the workloads. Since sizing alone cannot solve the SLO conformance problem, RBEC subsystem 910 leverages admission control to populate the SSD with appropriate data, such that the SLO of all workloads is met at the hybrid store layer. For example, assume that when a new workload is created on the storage system, some default rule entry is added into the rule table 940—e.g., cache metadata. In some embodiments, the per-workload controller 915*a*-915*n* communicates with the admission control under one of three conditions: 1) a new region is discovered; 2) a shift between regions; and 3) same regions, but the SLO is not being met.

Suppose W1 controller learns about a new region, such as region n. The controller has just sized the cache partition but has not seen the result (until the next action window). As a result, in some embodiments, the per-workload controller 915*a*-915*n* informs admission control that W1 has a new region n and admission control should determine the appropriate admission rules for this new region. As an example of a shift between regions, suppose that W1 was initially operating in region one but has shifted to region two. Then, W1 controller informs the admission control that the region of operation for W1 has changed from region one to region two. If the workload is operating in the same region, such as region n, but not meeting a SLO (e.g., latency), the workload controller informs the admission control that W1's region has not changed, but an SLO is not met. In addition, the workload controller requests the admission control perform a check to determine whether the rules are still valid for this region or not i.e., the working set or characteristics have changed. Thus, the RBEC subsystem 910 input acts as a trigger to the admission engine 930.

In some embodiments, the admission engine 930 reads the rules from the rule table and the workload characteristics from the workload characteristic monitor 920. If the rule is not appropriate for some reason, the rule is updated. The update in the rule table is reflected whenever data or metadata block belonging to that workload is evicted from the buffer cache. The admission engine 930 reacts to the three conditions (i.e., new region, shift between regions, and same region, but not meeting SLO) mentioned in different ways. For example, when a new region n is discovered by W1 controller, the admission engine 930 accesses the workload characteristic information about W1 from that time. The admission engine 930 tries to determine which HDD blocks are cacheable—i.e., start and end block numbers, and whether it is beneficial to cache both data and metadata or just either or none. Admission engine 930 can make appropriate entry in the admission rule table 940 corresponding to W1, rn. If the region does not look like a benefit will result from caching, an entry is not added and the W1 controller is informed that region n is not able to benefit from caching. The W1 RBEC controller makes an appropriate entry in its region table about the optimal SSD cache size corresponding to region n, i.e., it sets $s_{optimal(w1,rn)}$ to minimum SSD cache size (configurable or can be learned).

When W1's region of operation shifts from, for example, region one to region two, then admission engine 930 retrieves the rule entry corresponding to region two. It then makes the rule entry corresponding to W1, region two as the active rule entry. Thus, when any buffer cache evicts corresponding to W1 go through the admission engine, they abide by the active rule entry—W1, region two. This is useful because when a workload is operating in different regions, the workload's cacheable working set changes and/or the cacheability of data vs. metadata changes. The admission engine 930 will adapt to these two changes quickly.

When the workload is in the same region, but an SLO is not met, this could be because of two reasons: (1) working set has changed, (2) workload characteristics have changed (random vs. sequential workload). The admission engine 930 can determine which of the two reasons (mentioned above) are causing the SLO violation. Admission engine 930 can make this determination by looking at the workload characteristic from the monitor 920. In either of the two cases, admission control will adapt to changes by modifying the rule entry in the admission rule table 940. If the workload looks non-cacheable, it will inform W1 controller 915a, which will take appropriate actions in terms of cache sizing, as described above. In the non-cacheable case, admission engine 930 will remove the corresponding rule entry from the table 940.

Figure 10:
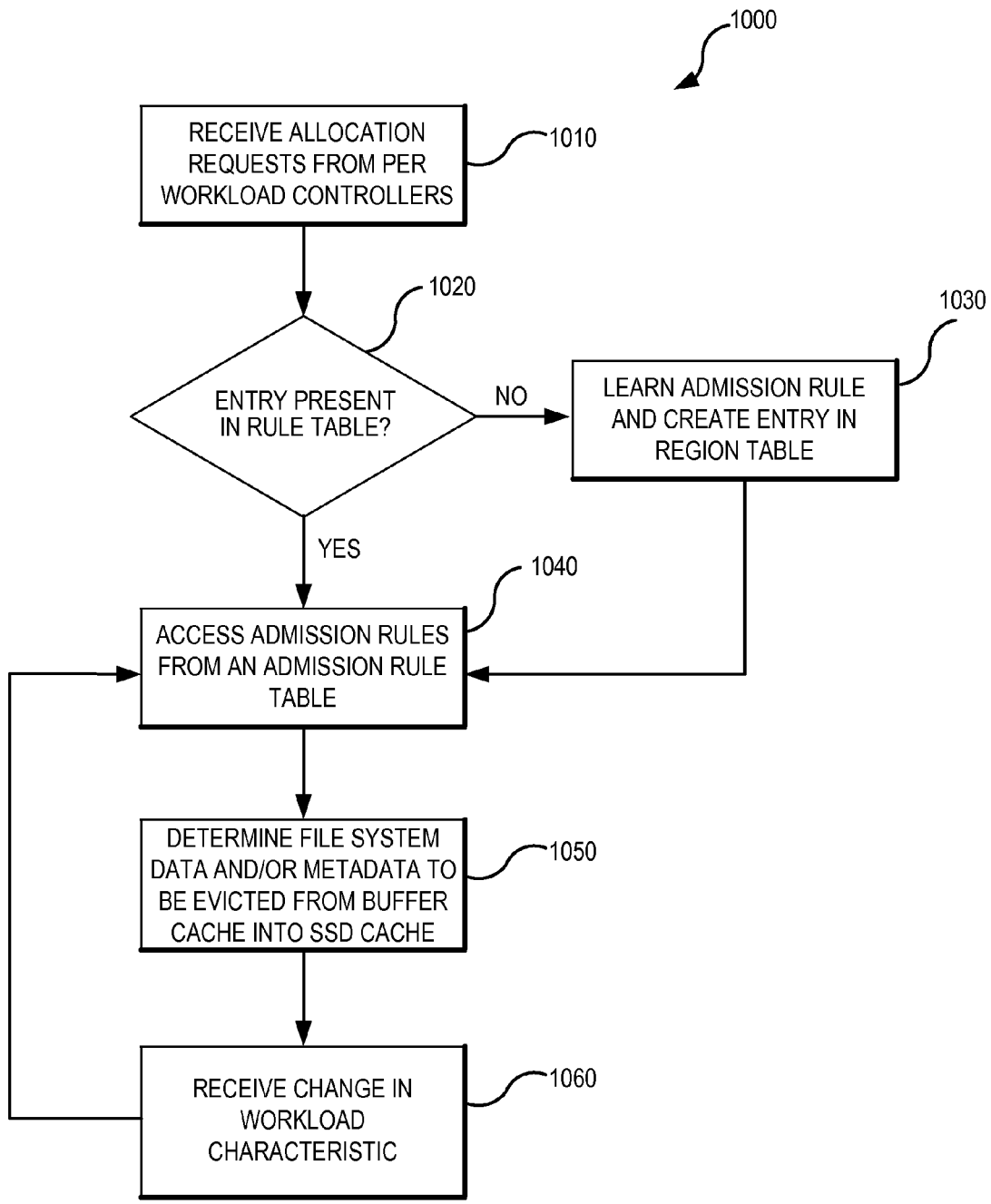
FIG. 10 is a flow chart illustrating a process for operating a region based admissions controller.

FIG. 10 is a flow chart illustrating a process 1000 for operating a region based admissions controller. The operations described within this process can be performed, for example, by admissions engine 930. During receiving operation 1010 allocation requests are received from the per-workload controllers. These requests are processed and determination operation 1020 determines if an entry in the rule table corresponds to the current state and region/phase of the workload. If an entry is not present, determination operation 1020 branches to learning operation 1030 where the admission rule is determined and an entry is created in the region table. Once the entry is created or if an entry is determined to be present by determination operation 1020, access operation 1040 accesses the admission rules and determines, using determination operation 1050, if file system data and/or metadata should be evicted from the buffer cache into the SSD cache. If a change in a workload characteristic is received during operation 1060, then access operation 1040 is invoked to access admission rules from the admission rule table.

Various embodiments result in advantages resulting from the coordination between the RBEC subsystem and the RBAC subsystem. One advantage is adapting to the changes in the workload quickly, after the different regions have been learned and intimated by the RBEC subsystem. Another advantage is that since the admission control adapts to the working set changes and the workload characteristic changes, classic caching problems like thrashing and pollution of cache are avoided.

In a more generalized case, the hybrid store can have n levels of storage caches followed by the permanent store (HDD). Let L1 represent the fastest, and smallest, while Ln represents the largest and the slowest. Suppose a workload W1 is running on this hierarchy. L1 being the first in the hierarchy, experiences W1's load without any modifications. Since some IO requests get satisfied by L1, only those that were missed by L1 come to L2. Hence, the load coming to L2 is transformed by L1. Similarly, the load experienced by L3 is a transformation of L2, and so on and so forth. Thus, Ln cache level experiences a transformation of the original workload by Ln−1. The transformation seen by Ln is a function of $<h_{(n-1)}, l_{ex(n-1)}, m_{(n)}>$, where $h_{(n-1)}$ is the hit ratio at Ln−1, $l_{ex(n-1)}$ is the expected latency at Ln−1, and $m_{(n)}$ is the slope of improvement in hit ratio (Ln) vs. size of Ln cache. This tuple is termed as the region of a workload, as seen from Ln cache level. The transformation function is as follows:

$$Ln\text{ cache size} = Tx(h_{(n-1)}, l_{ex(n-1)}, m_{(n)}),$$

where

Tx is the transformation function discussed above. As each level of cache depends on the previous level, the transformation function can be expanded as:

$$Ln\text{ cache size} = Tx(<h_{(n-1)}, l_{ex(n-1)}, m_{(n)}>,$$
$$<h_{(n-2)}, l_{ex(n-2)}, m_{(n)}>, <h_{(1)}, l_{ex(1)}, m_{(2)}>)$$

Note that the region-based eviction control assumes that each storage cache layer is capable of monitoring and advertising the statistics: hit ratio, current cache, and expected latency. If the statistics are available at Ln and Ln-1 cache level, the RBEC subsystem can optimally size Ln to meet the performance SLO.

In a similar fashion, the RBAC subsystem can also be applied to any level of cache. Each cache level will have to maintain and augment its own rule table, based on the different regions of a workload. As described above the RBEC subsystem and RBAC subsystem at each cache level, communicate amongst themselves to appropriately use the cache in order to meet performance SLOs.

In conclusion, the present invention provides novel systems, methods and arrangements for the region based admission and eviction control of a hybrid storage system. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method of service level objective compliance at a storage layer for a plurality of workloads on a storage system, the method comprising:
   determining, by a first workload controller for a first workload of the plurality of workloads, a current phase of the first workload based, at least in part, on
   a hit ratio in a first level cache of the storage system for the first workload in a time interval t and a slope value of the time interval t, wherein the slope value is based on a hit ratio in a second level cache for the first workload in the time interval t and an amount used value of the second level cache for the first workload in the time interval t;

wherein the second level cache comprises a non-volatile solid state storage device of the storage system;
determining whether the current phase of the first workload has previously been observed;
in response to a determination that the current phase has not previously been observed,
  determining a second level cache partition size based, at least in part, on a calculated hit ratio for the second level cache that corresponds to a service level objective indicated for the first workload in the time interval t;
  associating the current phase with the hit ratio in the first level cache in t, the slope value of t, and the determined second level cache partition size;
in response to a determination that a preceding phase of the first workload is different than the current phase and that the current phase has been previously observed as phase n of the first workload,
  determining a second level cache partition size indicated for phase n;
  requesting, by the first workload controller, a master controller for allocation of the second level cache partition size indicated for phase n to the first workload;
in response to a determination that the current phase has been previously observed as phase n of the first workload and that a service level objective for the first workload is not being satisfied,
  requesting, by the first workload controller, the master controller for allocation of the second level cache partition size indicated for phase n to the first workload if the amount used value of the second level cache for the first workload in time interval t is less than the second level cache partition size indicated for phase n of the first workload;
resizing, by the master controller, a second level cache partition allocated from the second level cache to the first workload in accordance with a set of one or more resizing requests from a plurality of workload controllers and states of satisfaction of service level objectives across the plurality of workloads,
wherein the plurality of workload controllers includes the first workload controller.

2. The method of claim 1, wherein the method further comprises:
collecting statistics for the plurality of workloads on a periodic interval of a first duration, wherein the time interval t has a second duration that is a multiple of the first duration; and
each of the workload controllers periodically sampling the collected statistics of a corresponding one of the plurality of workloads.

3. The method of claim 1, wherein the statistics include IO deadlines and IO response times.

4. The method of claim 2, wherein the statistics include SLO statistics that measure one or more of latency, throughput, security, reliability, or capacity.

5. A method comprising:
caching, within a first level cache, file system data and metadata from a workload having a plurality of operational regions;
in response to a determination that a first operational region has not previously been observed based, at least in part, on statistics of the workload of a time interval t,
  monitoring the workload for a time period to determine whether caching data of the workload that is evicted from the first level cache into a second level cache will will meet or improve compliance with a service level objective (SLO) of the workload;
  in response to a determination that caching data of the workload that is evicted from the first level cache into the second level cache will not meet or improve compliance with the SLO of the workload, updating a set of admission rules to prevent caching data of the workload into the second level cache when evicted from the first level cache and when the workload is in the first operational region;
  in response to a determination that caching data of the workload that is evicted from the first level cache into the second level cache will meet or improve compliance with the SLO of the workload, updating the set of admission rules to allow caching data of the workload into the second level cache when evicted from the first level cache and when the workload is in the first operational region;
in response to a determination that the first operational region has previously been observed and that the SLO of the workload is not being met based, at least in part, on the statistics of the workload of the time interval t,
  modifying the set of admission rules with respect to the first operational region of the workload based, at least in part, on a determination of whether caching data of the workload into the second level cache when evicted from the first level cache will meet or improve compliance with the SLO.

6. The method of claim 5, further comprising determining the first operational region of the workload with the statistics, wherein the statistics at least include a hit ratio in the first level cache for the workload in the time interval t, a used amount value of the second level cache by the workload for the time interval t, and a hit ratio of the workload in the second level cache for the workload in the time interval t.

7. The method of claim 5, further comprising:
determining a set of changes in the plurality of operational regions for the workload; and
updating the set of admission rules in accordance with the set of changes in the plurality of operational regions for the workload.

8. The method of claim 5, further comprising, in response to a determination that the workload has shifted from a second operational region to the first operational region, selecting an admission rule from the set of admission rules that is specified for the second operational region.

9. The method of claim 5 further comprising:
after detecting resize of a second level cache partition for the first operational region of the workload, monitoring second level cache statistics and service level objective statistics of the workload to determine whether caching data of the workload into the second level cache when evicted from the first level cache meets or improves compliance with the service level object of the workload;
updating the set of admission rules to allow caching into the second level cache for data evicted from the first level cache when the workload is in the first operational region if the monitored service level objective statistics improve and the second level cache statistics improve; and
updating the set of admission rules to prevent caching into the second level cache for data evicted from the first level cache when the workload is in the first operational region if either the monitored service level objective statistics or the second level cache statistics do not improve.

10. The method of claim 1 further comprising:
in response to the determination that the current phase of the first workload has not previously been observed, requesting, by the first workload controller, a resize to the determined second level cache partition size if a current allocation of the second level cache to the first workload is less than the determined second level cache partition size.

11. The method of claim 1, further comprising:
in response to a determination that the first workload is using more than the second level cache partition size indicated for phase n while the first workload is in phase n and that a service level objective for the first workload is not being met, the first workload controller indicating to the master controller that the first workload fails to meet the service level objective for the first workload.

12. The method of claim 11 further comprising the master controller notifying a layer above the storage layer that the first workload is failing to meet the service level objective for the first workload.

13. The method of claim 1 further comprising:
in response to a determination that the first workload exceeds the service level objective for the first workload and that the first workload is using less than the second level cache partition size indicated for phase n while the first workload is in phase n, indicating to the master controller that the service level objective for the first workload is being exceeded and that the first workload is using less than the second level cache partition size indicated for phase n while in phase n.

14. The method of claim 13 further comprising the master controller reducing the second level cache partition size for phase n of the first workload based, at least in part, on the indication.

15. The method of claim 14, further comprising:
determining, by the master controller, that at least one of the plurality of workloads is failing to meet a corresponding service level objective,
wherein the master controller reduces the second level cache partition size for phase n of the first workload also based, at least in part, on the determination that at least one of the plurality of workloads is failing to meet a corresponding service level objective.

16. The method of claim 1 further comprising:
mapping a plurality of first level cache hit ratios collected in the time interval t for the first workload into a set of one or more hit ratio ranges;
determining a first range of the set of one or more ranges that has a greatest number of the plurality of first level cache hit ratios;
calculating the hit ratio in the first level cache for the first workload in the time interval t based, at least in part, on those of the plurality of first level cache hit ratios that mapped to the first range;
calculating a plurality of slope values with a plurality of second level cache hit ratios for the first workload in the time interval t and a plurality of second level cache used amounts for the first workload during the time interval t;
calculating the slope value based, at least in part, on the plurality of slope values.

17. The method of claim 16, wherein calculating the slope value comprises calculating an average of the plurality of slope values.

18. The method of claim 17, further comprising:
calculating a standard deviation of the plurality of slope values;
wherein determining the second level cache partition size is also based, at least in part, on the standard deviation and the average of the plurality of slope values.

19. The method of claim 1 further comprising:
determining, by the master controller, the states of satisfaction of the service level objectives across the plurality of workloads based, at least in part, on service level objective statistics collected in the time interval t for the plurality of workloads; and
determining, by the master controller, priorities among the plurality of workloads,
wherein resizing by the master controller is also based on the priorities among the plurality of workloads.

20. One or more non-transitory machine-readable media having stored thereon instructions for storage layer compliance of service level objectives across a plurality of workloads, the instructions to:
determine a current phase of a first workload of the plurality of workloads based, at least in part, on a hit ratio in a first level cache of a storage system for the first workload in a time interval t and a slope value of the time interval t, wherein the slope value is based on a hit ratio in a second level cache of the storage system for the first workload in the time interval t and an amount used value of the second level cache for the first workload in the time interval t;
determine whether the current phase of the first workload has previously been observed;
in response to a determination that the current phase has not previously been observed,
determine a second level cache partition size for the current phase of the first workload based, at least in part, on a calculated hit ratio for the second level cache that corresponds to a service level objective indicated for the first workload in the time interval t;
associate the current phase with the hit ratio in the first level cache in t, the slope value of t, and the determined second level cache partition size;
in response to a determination that a preceding phase of the first workload is different than the current phase and that the current phase has been previously observed as phase n of the first workload,
determine a second level cache partition size indicated for phase n;
request allocation of the second level cache partition size indicated for phase n to the first workload;
in response to a determination that the current phase has been previously observed as phase n of the first workload and that a service level objective for the first workload is not being satisfied,
request allocation of the second level cache partition size indicated for phase n to the first workload if the amount used value of the second level cache for the first workload in time interval t is less than the second level cache partition size indicated for phase n of the first workload;
determine resizing of second level cache partitions allocated from the second level cache to the plurality of workloads in accordance with a set of one or more resizing requests and states of satisfaction of service level objectives across the plurality of workloads.

21. The non-transitory machine-readable media of claim 20, wherein the instructions further comprise instructions to:
in response to the determination that the current phase of the first workload has not previously been observed, request a resize to the determined second level cache partition size if a current allocation of the second level cache to the first workload is less than the determined second level cache partition size.

22. The non-transitory machine-readable media of claim 20, wherein the instructions further comprise instructions to:
map a plurality of first level cache hit ratios collected in the time interval t for the first workload into a set of one or more hit ratio ranges;
determine a first range of the set of one or more ranges that has a greatest number of the plurality of first level cache hit ratios;
calculate the hit ratio in the first level cache for the first workload in the time interval t based, at least in part, on those of the plurality of first level cache hit ratios that mapped to the first range;
calculate a plurality of slope values with a plurality of second level cache hit ratios for the first workload in the time interval t and a plurality of second level cache used amounts for the first workload during the time interval t;
calculate the slope value based, at least in part, on the plurality of slope values.

23. The non-transitory machine-readable media of claim 20, wherein the instructions further comprise instructions to:
determine, with service level objective statistics of the statistics, whether the first workload exceeds the service level objective for the first workload and whether the first workload is using less than the second level cache partition size indicated for phase n while the first workload is in phase n.

24. The non-transitory machine-readable media of claim 23, wherein the instructions further comprise instructions to reduce the second level cache partition size for phase n of the first workload based, at least in part, on a determination that the first workload exceeds the service level objective for the first workload and that the first workload is using less than the second level cache partition size indicated for phase n while the first workload is in phase n.

25. A storage system comprising:
a processor;
a first level of cache;
a non-volatile solid state storage device configured as a second level of cache for the storage system;
a machine-readable medium having stored therein instructions executable by the processor to cause the storage system to,
determine a current phase of a first workload of a plurality of workloads based, at least in part, on a hit ratio in a first level cache of a storage system for the first workload in a time interval t and a slope value of the time interval t, wherein the slope value is based on a hit ratio in a second level cache of the storage system for the first workload in the time interval t and an amount used value of the second level cache for the first workload in the time interval t;
determine whether the current phase of the first workload has previously been observed;
in response to a determination that the current phase has not previously been observed,
determine a second level cache partition size for the current phase of the first workload based, at least in part, on a calculated hit ratio for the second level cache that corresponds to a service level objective indicated for the first workload in the time interval t;
associate the current phase with the hit ratio in the first level cache in t, the slope value of t, and the determined second level cache partition size;
in response to a determination that a preceding phase of the first workload is different than the current phase and that the current phase has been previously observed as phase n of the first workload,
determine a second level cache partition size indicated for phase n;
request allocation of the second level cache partition size indicated for phase n to the first workload;
in response to a determination that the current phase has been previously observed as phase n of the first workload and that a service level objective for the first workload is not being satisfied,
request allocation of the second level cache partition size indicated for phase n to the first workload if the amount used value of the second level cache for the first workload in time interval t is less than the second level cache partition size indicated for phase n of the first workload;
determine resizing of second level cache partitions allocated from the second level cache to the plurality of workloads in accordance with a set of one or more resizing requests and states of satisfaction of service level objectives across the plurality of workloads.

26. The storage system of claim 25, wherein the instructions further comprise instructions executable by the processor to cause the storage system to:
in response to the determination that the current phase of the first workload has not previously been observed, request a resize to the determined second level cache partition size if a current allocation of the second level cache to the first workload is less than the determined second level cache partition size.

27. The storage system of claim 25, wherein the instructions further comprise instructions executable by the processor to cause the storage system to:
map a plurality of first level cache hit ratios collected in the time interval t for the first workload into a set of one or more hit ratio ranges;
determine a first range of the set of one or more ranges that has a greatest number of the plurality of first level cache hit ratios;
calculate the hit ratio in the first level cache for the first workload in the time interval t based, at least in part, on those of the plurality of first level cache hit ratios that mapped to the first range;
calculate a plurality of slope values with a plurality of second level cache hit ratios for the first workload in the time interval t and a plurality of second level cache used amounts for the first workload during the time interval t;
calculate the slope value based, at least in part, on the plurality of slope values.

28. The storage system of claim 25, wherein the instructions further comprise instructions executable by the processor to cause the storage system to:
determine, with service level objective statistics of the statistics, whether the first workload exceeds the service level objective for the first workload and whether the first workload is using less than the second level cache partition size indicated for phase n while the first workload is in phase n.

29. The storage system of claim 28, wherein the instructions further comprise instructions executable by the processor to cause the storage system to reduce the second level cache partition size for phase n of the first workload based, at least in part, on a determination that the first workload exceeds the service level objective for the first workload and that the first workload is using less than the second level cache partition size indicated for phase n while the first workload is in phase n.

* * * * *